United States Patent
Kang et al.

(10) Patent No.: US 11,090,609 B2
(45) Date of Patent: Aug. 17, 2021

(54) FORWARD OSMOSIS PERFORMANCE IMPROVED MEMBRANE APPARATUS AND METHOD OF SEPARATING SOLUTION USING THE SAME

(71) Applicant: BENIT M CO., LTD., Ulsan (KR)

(72) Inventors: Ki Joon Kang, Ulsan (KR); Gregorius Rionugroho Harvianto, Ulsan (KR); Kwang Hyun Kim, Ulsan (KR)

(73) Assignee: BENIT M CO., LTD.

( * ) Notice: Subject to any disclaimer, the term of this patent is extended or adjusted under 35 U.S.C. 154(b) by 0 days.

(21) Appl. No.: 16/623,682

(22) PCT Filed: Mar. 19, 2019

(86) PCT No.: PCT/KR2019/003180
§ 371 (c)(1),
(2) Date: Dec. 17, 2019

(87) PCT Pub. No.: WO2020/017729
PCT Pub. Date: Jan. 23, 2020

(65) Prior Publication Data
US 2021/0046424 A1 Feb. 18, 2021

(30) Foreign Application Priority Data

Jul. 20, 2018 (KR) .......................... 10-2018-0084959

(51) Int. Cl.
*B01D 61/36* (2006.01)
*B01D 61/58* (2006.01)
(Continued)

(52) U.S. Cl.
CPC ............. *B01D 61/58* (2013.01); *B01D 5/006* (2013.01); *B01D 61/005* (2013.01);
(Continued)

(58) Field of Classification Search
CPC ...... B01D 61/58; B01D 5/006; B01D 61/362; B01D 63/04; B01D 61/005; B01D 63/06;
(Continued)

(56) References Cited

U.S. PATENT DOCUMENTS 8,900,458 B2  12/2014  Tateishi
9,248,105 B2   2/2016  Audett
(Continued)

FOREIGN PATENT DOCUMENTS

CN  101547735  9/2009
CN  103663821  3/2014
(Continued)

OTHER PUBLICATIONS

Taqsim Husnain, Yaolin Liu, Rumana Riffat, Baoxia Mi, Integration of forward osmosis and membrane distillation for sustainable wastewater reuse, Separation and Purification Technology 156 (2015) 424-431. (Year: 2015).*

(Continued)

*Primary Examiner* — Pranav N Patel
(74) *Attorney, Agent, or Firm* — Perman & Green, LLP

(57) ABSTRACT

A membrane apparatus including a housing, a forward osmosis membrane dividing an internal space of the housing into an inlet region and a mixing region, and a pervaporation membrane dividing the internal space of the housing into the mixing region and a discharge region. The forward osmosis membrane separates a preliminary filtration liquid from an inlet liquid and provides the separated preliminary filtration liquid to the mixing region, the preliminary filtration liquid is mixed with a forward osmosis draw solution to make a mixed solution, the pervaporation membrane separates a final filtration liquid from the mixed solution and provides the separated final filtration liquid to the discharge region, the final filtration liquid is vaporized in the discharge region (Continued)

to make vapor, and an amount of the vapor is adjusted by at least one of a temperature of the mixed solution and a degree of vacuum of the discharge region.

13 Claims, 17 Drawing Sheets

(51) Int. Cl.
```
C02F 1/44      (2006.01)
B01D 61/00     (2006.01)
B01D 5/00      (2006.01)
B01D 61/02     (2006.01)
B01D 63/04     (2006.01)
B01D 63/06     (2006.01)
C02F 103/08    (2006.01)
```

(52) U.S. Cl.
CPC .......... *B01D 61/025* (2013.01); *B01D 61/362* (2013.01); *B01D 63/04* (2013.01); *B01D 63/06* (2013.01); *C02F 1/445* (2013.01); *C02F 1/448* (2013.01); *B01D 2311/06* (2013.01); *B01D 2311/103* (2013.01); *B01D 2311/14* (2013.01); *B01D 2311/246* (2013.01); *B01D 2313/243* (2013.01); *B01D 2313/32* (2013.01); *B01D 2319/04* (2013.01); *B01D 2319/06* (2013.01); *C02F 2103/08* (2013.01)

(58) Field of Classification Search
CPC .............. B01D 61/025; B01D 2311/06; B01D 2313/243; B01D 2311/103; B01D 2319/04; B01D 2311/14; B01D 2319/06; B01D 2313/32; B01D 2311/246; C02F 1/445; C02F 1/448; C02F 2103/08
See application file for complete search history.

(56) References Cited

U.S. PATENT DOCUMENTS

| 2010/0224476 A1 | 9/2010 | Cath et al. |
| 2018/0028977 A1* | 2/2018 | Ghaffour ................ B01D 61/58 |

FOREIGN PATENT DOCUMENTS

| CN | 103922530 A | 7/2014 |
| KR | 10-1184787 B1 | 9/2012 |
| KR | 10-2013-010520 A | 9/2013 |
| KR | 20130101520 | 9/2013 |
| KR | 10-2017-0047090 A | 5/2017 |

OTHER PUBLICATIONS

Dongwei Lu, Qianliang Liu, Yumeng Zhao, Huiling Liu, Jun Ma, Treatment and energy utilization of oily water via integrated ultrafiltration-forward osmosis-membrane distillation (UF-FO-MD) system, Journal of Membrane Science 548 (2018) 275-287. (Year: 2018).*

International Search Report of International Patent Application PCT/KR2019/003180 dated Jun. 18, 2019.

Notice of Allowance issued in Korean Patent Application 10-2018-0084949 dated Apr. 9, 2019.

Notice of Non-Final Rejection issued in Korean Patent Application 10-2018-0084949 dated Dec. 10, 2018.

Written Opinion. Intellectual Property Office of Signapore. 11202009435W. dated Apr. 15, 2021.

Office Action. China National Intellectual Property Administration. 201811570208.1. dated Jun. 21, 2021.

* cited by examiner

FORWARD OSMOSIS PERFORMANCE IMPROVED MEMBRANE APPARATUS AND METHOD OF SEPARATING SOLUTION USING THE SAME

CROSS REFERENCE TO RELATED APPLICATIONS

This application is a National Stage of International Application No. PCT/KR2019/003180, having an International Filing Date of 19 Mar. 2019, which designated the United States of America, which claims priority from and the benefit of Korean Patent Application No. 10-2018-0084959, filed on 20 Jul. 2018, the disclosures of which are incorporated herein by reference in their entireties.

BACKGROUND

1. Field

The present disclosure relates to a membrane separation apparatus and a method of separating a solution.

2. Brief Description of Related Developments

Generally, a membrane used to separate chemicals or water, such as petroleum, refinery, chemistry, fine chemistry, a shale gas process, toxic gas disposal, wastewater treatment, and desalination of seawater, is a semipermeable membrane with functions such as forward osmosis, reverse osmosis, selective gas separation, and pervaporation.

The membrane has properties such as hydrophilic, hydrophobic, organophilic, and organophobic, thereby, being used to selectively separate each of the chemicals due to a difference in property, such as intermolecular diffusivity due to a difference in concentration, a difference in charge repulsion, and a difference in molecular size.

A method of separating the chemicals using the membrane is to use a membrane apparatus with specific functions. For example, if a forward osmosis membrane is used, a forward osmosis membrane apparatus and a reverse osmosis membrane apparatus assembled independently can be used to separate the permeate from the feed solution. If the above-described independent membrane apparatuses are used, there is a problem that the apparatus is expensive and a large space is required.

The forward osmosis membrane apparatus includes a feed section in which a liquid containing a substance to be separated is supplied, and a draw solution section or a permeate section in which a draw solution is supplied and a substance that passes through a forward osmosis membrane is mixed with the draw solution. At this circumstance, the chemicals (permeate) selectively passing through the forward osmosis membrane is slowly diffused by diffusion of molecules in the osmotic solution, and it affects to the slow chemical diffusion rate from the forward osmosis membrane in the vicinity of the forward osmosis membrane. As the result, an osmotic pressure difference between two sides adjacent to the membrane is reduced, and thereby, a separation performance through the forward osmosis membrane is reduced.

In order to solve this problem, a diffusion speed can be increased by enhancing the membrane properties which able to increase the substance penetration to the draw solution section of the forward osmosis membrane, but since the diffusion speed is not remarkably increased, there is not enough effect to improve the forward osmosis performance.

In addition, in order to increase a diffusion effect of the chemicals, a method of making a draw solution pass through at a high-speed circulation can be used such that the draw solution can form turbulence in the draw solution portion space. However, there is a problem that the draw solution has to be circulated for this purpose, and even if the draw solution is made to pass through an apparatus at a high speed, a concentration of the draw solution is inevitably decreased by the chemicals while passing through the apparatus, and thus, the problem that the forward osmosis performance is decreased is not solved.

FIG. 17 illustrates a fresh water flux according to NaCl concentration as the draw solution. NaCl solution is used as the draw solution in a forward osmosis membrane apparatus to desalinate seawater having the NaCl concentration of 0.6 mol/L. Theoretically, the higher the NaCl concentration of the osmotic liquid, the higher the fresh water flux has to be, but in actual operation, water passing through the forward osmosis membrane from the seawater is mixed with the osmotic solution and is not rapidly diffused in the vicinity of the osmotic membrane, and thereby, the fresh water flux is remarkably reduced.

In order to solve this problem, a forward osmosis-membrane distillation unit can be configured by integrating a forward osmosis membrane with a membrane distillation membrane. However, the membrane distillation membrane has pores and evaporates the osmotic solution to discharge a gas phase material through the pores in the membrane distillation membrane, resulting in high energy consumption. In addition, if the membrane distillation membrane is made to be in a wet state due to water blocking the pores, a material that has to be separated by being evaporated cannot escape through the pores. Therefore, if it is mandatory that a hydrophobic membrane is used to separate the material due to the hydrophilic property of a separation membrane, there are restrictions on use. For this reason, it is difficult to constantly keep a concentration of a forward osmosis draw solution diluted by a filtration liquid passed through the forward osmosis membrane.

Another solution to the problem is to configure a forward osmosis-filter unit by integrating a forward osmosis membrane with a microfilter, a nanofilter or an ultrafilter. However, if a substance having small molecules is used as a draw solution so as to filter water by using a filter, the draw solution passing through the filter can be lost, and thereby, there is a restriction that only a polymer substance solution has to be used as the draw solution. However, if the polymer substance solution is used as the draw solution, an osmotic pressure difference is reduced, and thus, there is a problem that the amount of water passing through the forward osmosis membrane becomes is reduced.

SUMMARY

An object to be solved is to provide a membrane apparatus with improved forward osmosis performance.

Another object to be solved is to provide a membrane apparatus which has a small footprint.

Still another object to be solved is to provide a method of separating a solution in which forward osmosis performance is improved.

However, the objects are not limited to the above disclosure.

In one aspect, there is provided a membrane apparatus including a housing, a forward osmosis membrane that divides an internal space of the housing into an inlet region and a mixing region, and a pervaporation membrane that divides the internal space of the housing into the mixing region and a discharge region, in which the forward osmosis membrane separates a preliminary filtration liquid from an inlet liquid which is provided in the inlet region and provides the separated preliminary filtration liquid to the mixing region, in which the preliminary filtration liquid is mixed with a forward osmosis draw solution in the mixing region to make a mixed solution, in which the pervaporation membrane separates a final filtration liquid from the mixed solution and provides the separated final filtration liquid to the discharge region, and in which the final filtration liquid is vaporized in the discharge region to make vapor.

The membrane apparatus may further include a control portion that adjusts at least one of a temperature of the mixed solution and a degree of vacuum of the discharge region. The amount of vapor may be adjusted by at least one of the temperature of the mixed solution and the degree of vacuum of the discharge region.

The forward osmosis draw solution may include a mineral salt, and the mineral salt may include a sodium chloride (NaCl) solution.

The degree of vacuum of the discharge region and the temperature of the mixed solution may be adjusted corresponding to a solute concentration of the mixed solution.

The membrane apparatus may further include an inlet liquid supply portion that supplies an inlet liquid to the inlet region, a condenser that condenses the vapor to regenerate a final filtration liquid, and a vacuum pump that adjusts the degree of vacuum of the discharge region.

The forward osmosis membrane may have a flat plate shape, and the pervaporation membrane may have a flat plate shape and is arranged in parallel with the forward osmosis membrane.

The forward osmosis membrane and the pervaporation membrane may have a tube shape or a hollow fiber shape.

A plurality of the forward osmosis membranes or a plurality of the pervaporation membranes may be provided.

The membrane chamber may further include a reverse osmosis membrane that divides the mixing region into a first mixing region and a second mixing region.

In another aspect, there is provided a method of separating a solution using a membrane apparatus including preparing a membrane chamber including a housing, a forward osmosis membrane that divides an internal space of the housing into an inlet region and a mixing region, and a pervaporation membrane that divides the internal space of the housing into the mixing region and a discharge region; providing an inlet liquid and a forward osmosis draw solution to the inlet region and the mixing region, respectively; mixing the preliminary filtration liquid that is separated from the inlet liquid with the forward osmosis draw solution to make a mixed solution; and providing a final filtration liquid that is separated from the mixed solution to the discharge region to evaporate the final filtration liquid in the discharge region.

The method of separating the solution using the membrane apparatus may further including controlling at least one of a temperature of the mixed solution and a degree of vacuum of the discharge region corresponding to the solute concentration of the mixed solution, and the amount of evaporation of the final filtration liquid may be adjusted by at least one of the temperature of the mixed solution and the degree of vacuum of the discharge region.

The method of separating a solution using the membrane apparatus may further including condensing the vapor to regenerate the final filtration liquid.

The method of separating a solution using the membrane apparatus may be provided in which an osmotic pressure of the mixed solution is constantly maintained.

A membrane apparatus with improved forward osmosis performance may be provided.

A small footprint membrane apparatus may be provided.

A method of separating a solution in which forward osmosis performance is improved may be provided.

However, the effects are not limited to the above disclosure.

DETAILED DESCRIPTION

Figure 1:
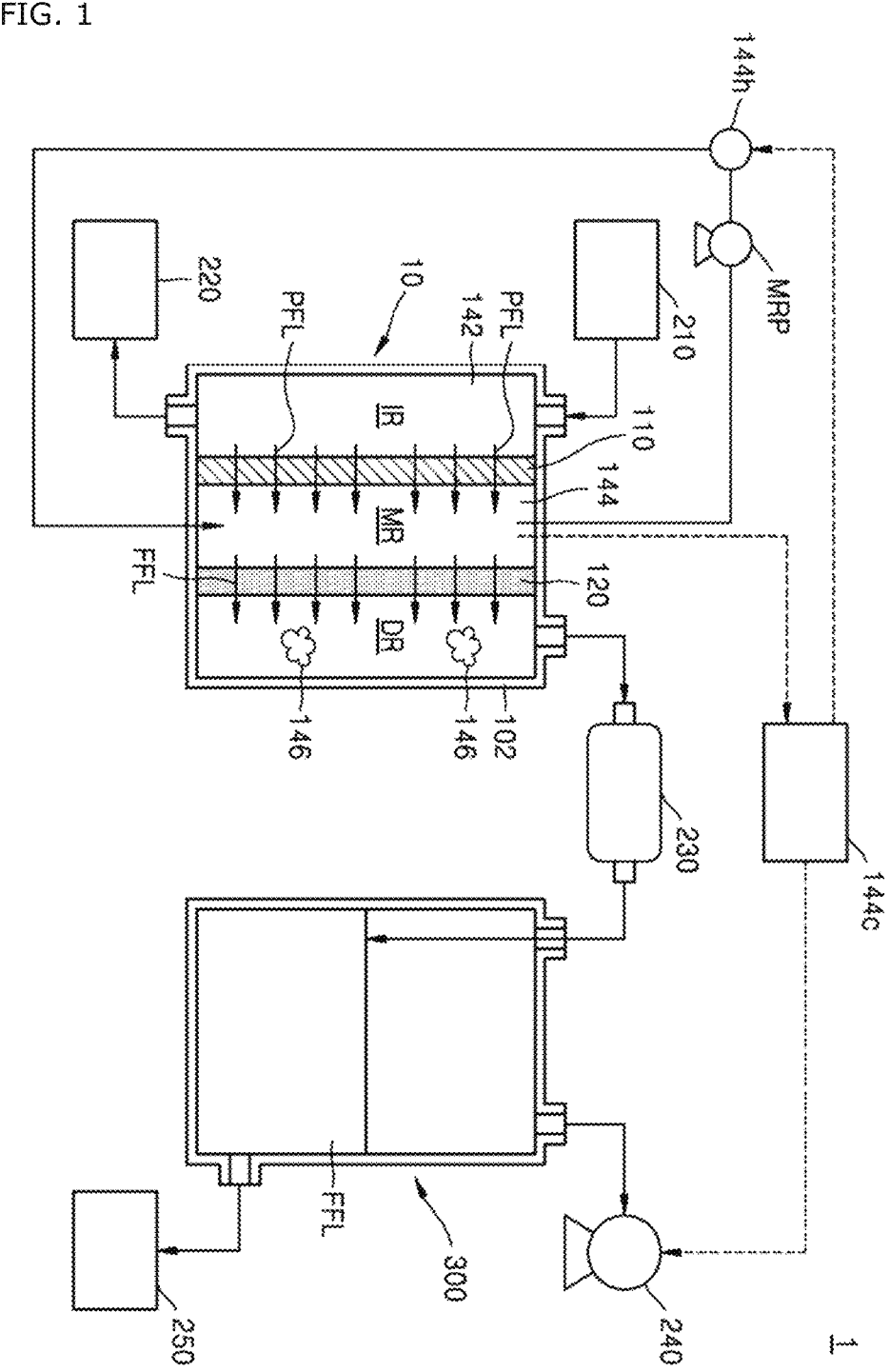
FIG. 1 is a block diagram of a membrane apparatus according to exemplary aspects of the disclosure.

Hereinafter, aspects of the present disclosure will be described in detail with reference to the accompanying drawings. In the following drawings, like reference numerals or symbols refer to elements, and a size of each element in the drawings can be exaggerated for the sake of clear and convenient description. Meanwhile, the aspects of the disclosure described below are merely illustrative, and various modifications can be made from the aspects of the disclosure.

Hereinafter, what is referred to as "upper portion" or "upper" can include not only being directly on in a contacted state, but also being directly on without contact.

A singular form includes plural expressions unless expressly stated otherwise in the context. In addition, when it is described that a certain portion includes a certain configuration element, it means that the certain portion can further include other elements, not excluding other elements unless stated otherwise in particular.

A term such as ". . . portion", which is described in the specification, means a unit for processing at least one function or operation, which can be realized by hardware or software or can be realized by a combination of the hardware and the software.

FIG. 1 is a block diagram of a membrane apparatus according to exemplary aspects of the disclosure.

Referring to FIG. 1, a membrane apparatus 1 including a membrane chamber 10, an inlet liquid supply portion 210, a residue processing portion 220, a condenser 230, a vacuum pump 240, a filtration liquid storage portion 250, and a liquid collection chamber 300 can be provided.

The membrane chamber 10 can include a housing 102, an inlet region IR, a mixing region MR, a discharge region DR, a forward osmosis membrane 110, and a pervaporation membrane 120. The housing 102 can include a material that resists an internal pressure of the housing 102.

The inlet region IR can store an inlet liquid 142. The inlet liquid 142 can be supplied to the inlet region IR from the inlet liquid supply portion 210. A valve (not illustrated) and a pump (not illustrated) can be provided between the inlet liquid supply portion 210 and the membrane chamber 10 to control a flow of the inlet liquid 142. The inlet liquid 142 may be a solution in which a preliminary filtration liquid PFL and a residue are mixed. The preliminary filtration liquid PFL can include a solvent of the inlet liquid 142. For example, the inlet liquid 142 may be sea water or waste water, and the preliminary filtration liquid PFL may be water.

The preliminary filtration liquid PFL and the inlet liquid 142 can be separated from each other by a forward osmosis phenomenon which will be described below. The inlet liquid 142 separated from the preliminary filtration liquid PFL can be provided to the residue processing portion 220 from the membrane chamber 10. The residue processing portion 220 can discard the inlet liquid 142 separated from the preliminary filtration liquid PFL.

The mixing region MR can store the mixed solution 144. The mixed solution 144 can include the preliminary filtration liquid PFL and a forward osmosis draw solution. The forward osmosis draw solution can contain a substance being in an ionic state in an aqueous solution. For example, the forward osmosis draw solution can contain mineral salt, such as $SO_2$, $MgCl_2$, $CaCl_2$, NaCl, KCl, $MgSO_4$, $KNO_3$, $NH_4HCO_3$, $NaHCO_3$, or aluminum sulfate, polymer chemicals such as aliphatic alcohol, glucose, fructose, and sucrose, or a combination thereof. A solute concentration in the forward osmosis draw solution can be higher than the solute concentration in the inlet liquid 142. A solute concentration in the mixed solution 144 can be higher than a solute concentration in the inlet liquid 142. The mixed solution 144 can contain a substance to be separated. For example, the substance to be separated may be pure water.

The mixed solution 144 can be circulated by a mixing pump MRP. For example, the mixed solution 144 can be discharged from the mixing region MR by the mixing pump MRP and then can be injected into the mixing region MR again.

The mixed solution 144 discharged from the mixing region MR can be heated by the mixed solution heating portion 144h. For example, a temperature of the mixed solution 144 can be maintained at 15° C. to 150° C. by the mixed solution heating portion 144h. If the temperature of the mixed solution 144 is higher than or equal to 150° C., selecting the membranes can be restricted and an energy consumption can increase. If the temperature of the mixed solution 144 is lower than or equal to 15° C., a pervaporation phenomenon may not occur smoothly. For example, the mixed solution heating portion 144h may be a device that uses electricity, oil, and/or hot water as a heat source. Preferably, a waste heat lower than or equal to approximately 170° C., more preferably a waste heat lower than or equal to approximately 120° C. can be utilized. The membrane apparatus according to the present disclosure can have an advantage of utilizing waste heat.

In addition, the mixed solution heating portion 144h can be installed inside the mixing region MR in the form of a plate or a rod, instead of being installed outside the membrane chamber 10.

The forward osmosis membrane 110 can be located between an inlet region IR and the mixing region MR to separate the inlet region IR and the mixing region MR. For example, the forward osmosis membrane 110 can have a flat plate shape extending in one direction. The forward osmosis membrane 110 acts as a semi-permeable membrane when a forward osmosis occurs between the inlet liquid 142 in the inlet region IR and a forward osmosis draw solution in the mixing region MR. The forward osmosis membrane 110 can include polymer, ceramic, carbon, or a combination thereof. For example, the forward osmosis membrane 110 can include a cellulose-based membrane, a polyamide-based membrane, a polyarylene-based membrane, or a combination thereof.

A discharge region DR can store vapor 146. The vapor 146 can be generated by evaporating a final filtration liquid FFL separated from the mixed solution 144. The final filtration liquid FFL can contain a substance, which will be separated, of the mixed solution 144. For example, the final filtration liquid (FFL) can be pure water and the vapor 146 can be steam. The discharge region DR can be in a vacuum state. A phenomenon in which the final filtration liquid FFL is separated from the mixed solution 144 and evaporates in the discharge region DR can be referred to as a pervaporation phenomenon. The discharge region DR can discharge the vapor 146 out of the membrane chamber 10. The vapor 146 can move from the membrane chamber 10 to the condenser 230.

Pervaporation membrane 120 can be located between the mixing region MR and the discharge region DR to separate the mixing region MR and the discharge region DR. For example, the pervaporation membrane 120 can have a flat plate shape extending in one direction. The pervaporation membrane 120 can face the forward osmosis membrane 110. The pervaporation membrane 120 can separate the final filtration liquid FFL from the mixed solution 144. For example, a separation membrane can include a hydrophilic membrane. In other exemplary aspects of the disclosure, if the final filtration liquid FFL is not water, the separation membrane can include the hydrophobic membrane.

The condenser 230 can condense the vapor 146 to regenerate the final filtration liquid FFL. For example, the condenser 230 can include a condenser that uses a refrigerant. The refrigerant can contain, for example, water, brine, or oil. The condenser 230 can provide the regenerated final filtration liquid FFL to the liquid collection chamber 300.

The liquid collection chamber 300 can store the final filtration liquid FFL provided from the condenser 230. The liquid collection chamber 300 can provide the final filtration liquid FFL to the filtration liquid storage portion 250.

The vacuum pump 240 can be provided on one side of the liquid collection chamber 300. The vacuum pump 240 can be various types of vacuum pumps or a barometric condenser and can reduce an atmospheric pressure inside the liquid collection chamber 300. An interior of the liquid collection chamber 300 and an interior of the discharge region DR can be connected to each other. The atmospheric pressure in the discharge region DR can be reduced by the vacuum pump 240. For example, the interior of the liquid collection chamber 300 and the discharge region DR can have a substantial vacuum state. The vacuum pump 240 can adjust a degree of vacuum of the discharge region DR corresponding to a solute concentration of the mixed solution 144. For example, if the solute concentration of the mixed solution 144 is lowered, the vacuum pump 240 increases the degree of vacuum of the discharge region DR to increase the amount of final filtration liquid FFL and increase the solute concentration of the mixed solution thereby constantly maintaining the solute concentration of the mixed solution. It is preferable that the degree of vacuum of the discharge region DR is 1 Torr to 660 Torr in absolute pressure. If the degree of vacuum is as low as 661 Torr to 759 Torr, a temperature of the mixed solution has to be excessively increased to over 150° C. and thereby the final filtration liquid FFL can be discharged as vapor.

A control portion 144c can be provided. The control portion 144c can control a concentration of the mixed solution 144 by controlling the vacuum pump 240 and the mixed solution heating portion 144h. For example, the control portion 144c can control the vacuum pump 240 such that the discharge region DR has a required degree of vacuum and can control the mixed solution heating portion 144h such that the mixed solution 144 has a required temperature. The concentration of the mixed solution 144 can be measured by the control portion 144c. In the exemplary aspects of the disclosure, at least one of the degree of vacuum of the discharge region DR and the temperature of the mixed solution 144 is controlled by the control portion 144c such that the concentration of the mixed solution 144 can be constantly maintained. The amount of vapor 146 can be controlled by at least one of the concentration of the mixed solution 144 and the degree of vacuum of the discharge region DR.

Generally, as a forward osmosis process is performed, a concentration of a forward osmosis draw solution can be lowered. If the concentration of the forward osmosis draw solution is lowered, a forward osmosis phenomenon may not occur smoothly. According to the present disclosure, since the preliminary filtration liquid PFL flows into the mixed solution 144 and simultaneously, the final filtration liquid FFL is separated from the mixed solution 144, the concentration of the mixed solution 144 can be constantly maintained. Accordingly, the forward osmosis phenomenon can occur smoothly. As a result, it is possible to provide the membrane apparatus 1 with improved forward osmosis performance.

The filtration liquid storage portion 250 can store the final filtration liquid FFL. A valve (not illustrated) and a pump (not illustrated) can be provided between the filtration liquid storage portion 250 and the liquid collection chamber 300 to control a flow of the final filtration liquid FFL.

Figure 2:
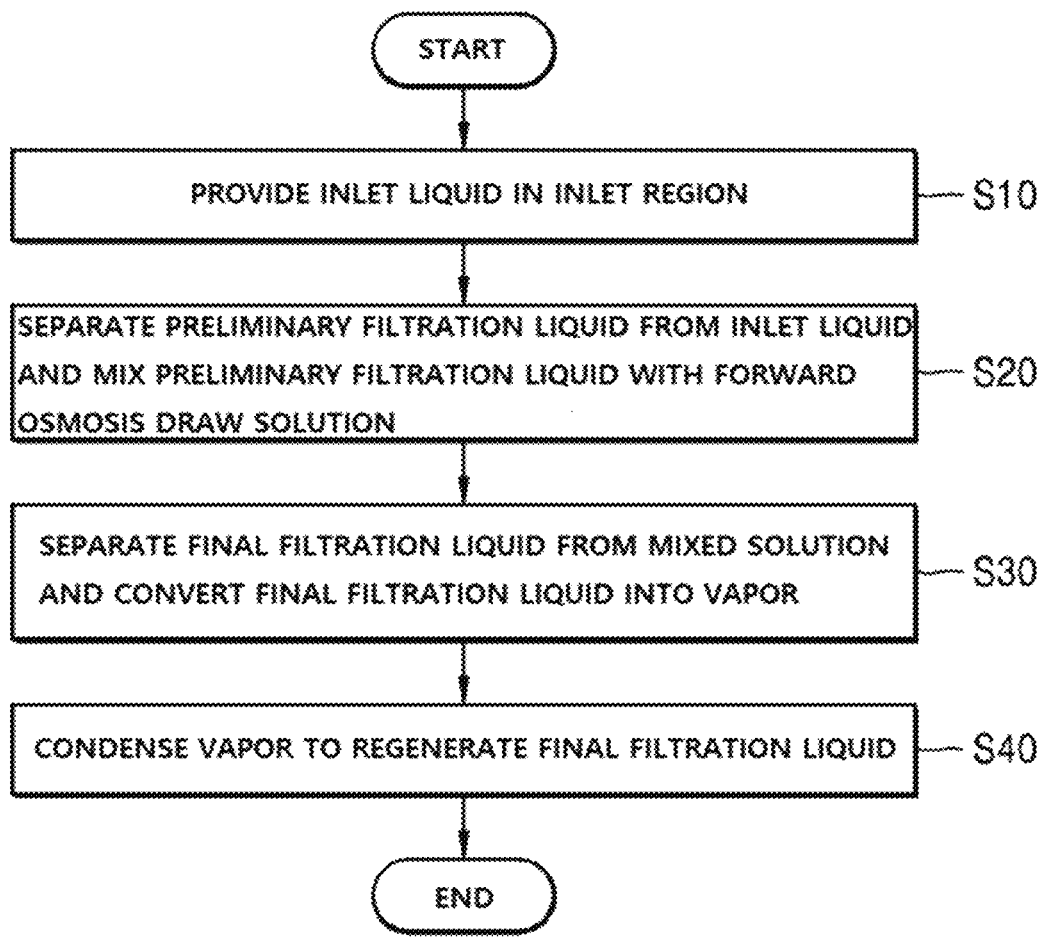
FIG. 2 is a flowchart illustrating an operation of the membrane apparatus of FIG. 1.

FIG. 2 is a flowchart illustrating an operation of the membrane apparatus of FIG. 1. For the sake of brief description, substantially the same content as described with reference to FIG. 1 may not be described.

Referring to FIGS. 1 and 2, the inlet liquid 142 can be provided in the inlet region IR (S10). The inlet liquid 142 can be provided in the inlet region IR from the inlet liquid supply portion 210. For example, the inlet liquid 142 can be seawater or wastewater.

The mixing region MR can be filled with a forward osmosis draw solution (not illustrated) before the inlet liquid 142 is provided to the inlet region IR. The forward osmosis draw solution can contain a substance being in an ionic state in an aqueous solution. For example, the forward osmosis draw solution can contain mineral salt, such as $SO_2$, $MgCl_2$, $CaCl_2$, NaCl, KCl, $MgSO_4$, $KNO_3$, $NH_4HCO_3$, $NaHCO_3$, or aluminum sulfate, polymer chemicals such as aliphatic alcohol, glucose, fructose, and sucrose, or a combination thereof. A solute concentration in the forward osmosis draw solution can be higher than the solute concentration in the inlet liquid 142. Accordingly, an osmotic pressure difference can occur between the inlet liquid 142 and the forward osmosis draw solution.

The osmotic pressure can be expressed by the following equation.

$$\pi = i \, c \, R \, T$$

$\pi$ is an osmotic pressure, i is number of osmotically active particles in the solution, c is a molar concentration, R is a universal gas constant, and T is an absolute temperature.

The above-described i can be expressed as follows.

$$i = 1 + \alpha(\nu - 1)$$

$\alpha$ is a degree of dissociation, and $\nu$ is a stoichiometric coefficient of dissociation reaction.

If the preliminary filtration liquid PFL is pure water, a permeation flux (water flux) of the preliminary filtration liquid PFL due to the forward osmosis phenomenon can be expressed as follows.

$$J_W = A(\pi_D - \pi_F)$$

$J_W$ is the permeation flux (water flux) of the preliminary filtration liquid, A is water permeability, $\pi_D$ is an osmotic pressure, and $\pi_F$ is an osmotic pressure of an inlet liquid.

The inlet liquid 142 can have a lower solute concentration than the forward osmosis draw solution. Accordingly, an osmotic pressure of the inlet liquid 142 can be lower than an osmotic pressure of the forward osmosis draw solution. A forward osmosis phenomenon can occur due to an osmotic pressure difference between the inlet liquid 142 and the forward osmosis draw solution. That is, the preliminary filtration liquid PFL in the inlet liquid 142 can be separated from the inlet liquid 142 and can move to the forward osmosis draw solution (S20). The preliminary filtration liquid PFL can be provided to the mixing region MR through the forward osmosis membrane 110. The preliminary filtration liquid PFL can contain a solvent of the inlet liquid 142. For example, the preliminary filtration liquid PFL can be water. The preliminary filtration liquid PFL and the forward osmosis draw solution can be mixed to produce the mixed solution 144.

The temperature of the mixed solution 144 may be a temperature between 15° C. and 150° C. If the temperature of the mixed solution 144 is higher than 150° C., usable membranes can be restricted. If the temperature of the mixed solution 144 is lower than 15° C., a pervaporation phenomenon may not occur smoothly.

As the preliminary filtration liquid PFL is supplied to the mixing region MR, a solute concentration in the mixed solution 144 can be reduced. Accordingly, the osmotic pressure of the mixed solution 144 can be lowered. Since the osmotic pressure of the inlet liquid 142 is constant, an osmotic pressure difference between the inlet liquid 142 and the mixed solution 144 can be reduced. In general, if the osmotic pressure difference between the inlet liquid 142 and the mixed solution 144 decreases, a speed at which the preliminary filtration liquid PFL moves from the inlet region IR to the mixing region MR can be reduced. The membrane apparatus according to the exemplary aspects of the disclosure aim to maintain the flux rate of preliminary filtration liquid from inside region IR to the mixed region MR.

A pervaporation phenomenon occurs in the pervaporation membrane 120, and thereby, the final filtration liquid FFL can be separated from the mixed solution 144. The final filtration liquid FFL can contain the solvent of the mixed solution 144. For example, the final filtration liquid FFL may be pure water. The final filtration liquid FFL can evaporate in the discharge region DR thereby being converted into vapor 146 (S30). For example, vapor 146 may be water steam. The vapor 146 may be discharged out of the membrane chamber 10 from the discharge region DR.

The discharge region DR may enter a vacuum state by a vacuum pump 240. The amount of evaporation of the final filtration liquid FFL can be determined according to a degree of vacuum of the discharge region DR. For example, the amount of evaporation of the final filtration liquid FFL when the degree of vacuum of the discharge region DR is higher may be more than the amount of evaporation of the final filtration liquid FFL when the degree of vacuum of the discharge region DR is lower. The amount of final filtration liquid FFL separated from the mixed solution 144 may be proportional to the amount of evaporation of the final filtration liquid FFL. The amount by which the final filtration liquid FFL is separated from the mixed solution 144 can be proportional to the evaporation amount of final filtration liquid FFL. Therefore, the degree of vacuum of the discharge region DR is controlled, and thereby, the amount of final filtration liquid FFL separated from the mixed solution 144 can be adjusted. It is preferable that the degree of vacuum of the discharge region DR is 1 Torr to 660 Torr in absolute pressure. If the degree of vacuum is as low as 661 Torr to 759 Torr, a temperature of the mixed solution has to be excessively increased to over 150° C. and thereby the final filtration liquid FFL can be discharged as vapor.

As the final filtration liquid FFL is separated from the mixed solution 144, a solute concentration in the mixed solution 144 can be increased. Since the amount of final filtration liquid FFL separated from the mixed solution 144 can be adjusted by the degree of vacuum of the discharge region DR, the degree of vacuum of the discharge region DR can be controlled and the solute concentration of the mixed solution 144 can be adjusted. The solute concentration of the mixed solution 144 can be adjusted such that the mixed solution 144 has a desired osmotic pressure. If the osmotic pressure of the mixed solution 144 is constantly maintained, a permeation flux of the preliminary filtration liquid PFL with respect to the forward osmosis membrane 110 can be constantly maintained.

The vapor 146 can move to the condenser 230. The vapor 146 can be condensed by the condenser 230 to regenerate the final filtration liquid FFL (S40). The regenerated final filtration liquid FFL can be provided from the condenser 230 to the liquid collection chamber 300. The final filtration liquid FFL can be provided to the filtration liquid storage portion 250 from the liquid collection chamber 300 to be stored in the filtration liquid storage portion 250.

According to the disclosure, the membranes 110 and 120 having different functions to each other can be provided in one membrane chamber 10. Accordingly, the membrane apparatus 1 can be minimized.

According to the above disclosure, at least one of the degree of vacuum of the discharge region DR and the temperature of the mixed solution 144 can be controlled by the control portion 144c and thereby the osmotic pressure of the mixed solution 144 can be constantly adjusted. The amount of vapor 146 can be adjusted by at least one of the concentration of the mixed solution 144 and the degree of vacuum of the discharge region DR. Accordingly, a permeation flux of the preliminary filtration liquid PFL can be constantly maintained.

Figure 3:
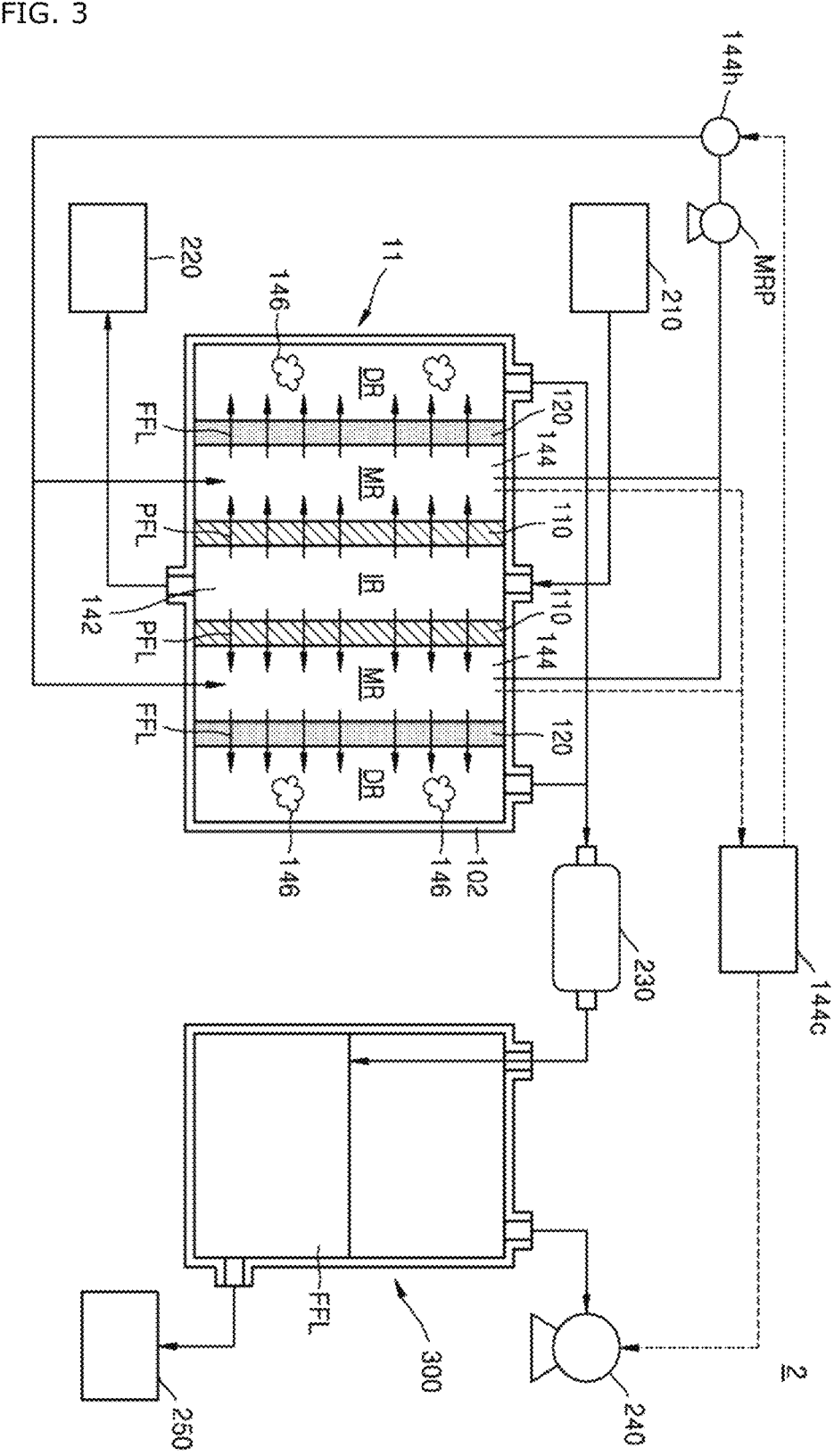
FIG. 3 is a block diagram of a membrane apparatus according to the exemplary aspects of the disclosure.
Figure 4:
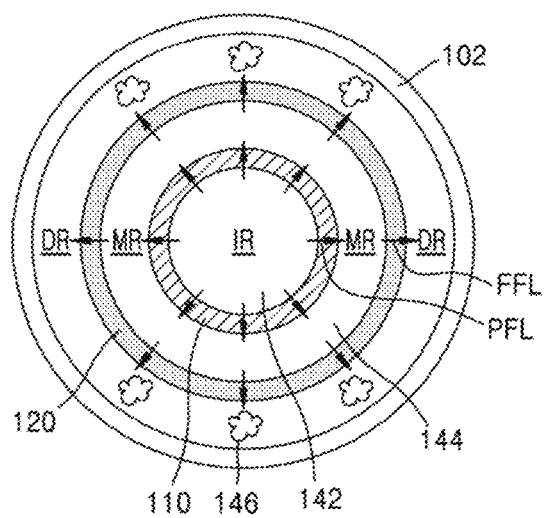
FIG. 4 is a sectional diagram of a membrane chamber of FIG. 3.

FIG. 3 is a block diagram of a membrane apparatus according to the exemplary aspects of the disclosure. FIG. 4 is a sectional diagram of the membrane chamber of FIG. 3. For the sake of brief description, substantially the same content as described with reference to FIGS. 1 and 2 may not be described.

Referring to FIGS. 3 and 4, a membrane chamber 2 including a membrane chamber 11, the mixing pump MRP, the mixed solution heating portion 144h, the control portion 144c, the inlet liquid supply portion 210, the residue processing portion 220, the condenser 230, the vacuum pump 240, the filtration liquid storage portion 250, and the liquid collection chamber 300 can be provided. The pump MRP, the mixed solution heating portion 144h, the control portion 144c, the inlet liquid supply portion 210, the residue processing portion 220, the condenser 230, the vacuum pump 240, the permeate solution storage portion 250, and the liquid collection chamber 300 may be substantially the same as described with reference to FIG. 1. The membrane chamber 11 may be substantially the same as the membrane chamber 10 described with reference to FIG. 1, except for a shape thereof. Hereinafter, a shape of the membrane chamber 11 will be described.

The membrane chamber 11 can include the housing 102, the inlet region IR, the mixing region MR, the discharge region DR, a forward osmosis membrane 110, and a pervaporation membrane 120. The housing 102 can include a material that resists a pressure within the membrane chamber 10. The housing 102 is illustrated in a cylindrical shape, and this is exemplary.

Unlike FIG. 1, the forward osmosis membrane 110 and the pervaporation membrane 120 can have a tube shape or a hollow fiber shape. The forward osmosis membrane 110 can be surrounded by the pervaporation membrane 120. That is, a diameter of the forward osmosis membrane 110 can be less than a diameter of the pervaporation membrane 120. The forward osmosis membrane 110 and the pervaporation membrane 120 can be separated from each other.

The inlet region IR can be defined by an inner side surface of the forward osmosis membrane 110. The mixing region MR can be defined by an outer side surface of the forward osmosis membrane 110 and an inner side surface of the pervaporation membrane 120. The discharge region DR can be defined by an outer side surface of the pervaporation membrane 120 and an inner side surface of the housing 102.

The preliminary filtration liquid PFL can be separated from the inlet liquid 142 by the forward osmosis membrane 110 and provided to the mixing region MR. For example, the preliminary filtration liquid PFL can flow radially in a diameter direction of the forward osmosis membrane 110. In the mixing region MR, the preliminary filtration liquid PFL can be mixed with the forward osmosis draw solution to produce the mixed solution 144. As the preliminary filtration liquid PFL is mixed with the mixed solution 144, a solute concentration of the mixed solution 144 can be lowered. Accordingly, an osmotic pressure of the mixed solution 144 can be lowered.

In the exemplary aspects of the disclosure, a temperature of the mixed solution 144 can be maintained at 15° C. to 150° C. by the mixed solution heating portion 144h. If the temperature of the mixed solution 144 is higher than or equal to 150° C., selecting the membranes can be restricted and an energy consumption can increase. If the temperature of the mixed solution 144 is lower than or equal to 15° C., a pervaporation phenomenon may not occur smoothly.

The final filtration liquid FFL can be separated from the mixed solution 144 by the pervaporation membrane 120. The final filtration liquid FFL can be evaporated in the discharge region DR to generate the vapor 146. The vapor 146 can be discharged out of the membrane chamber 11 from the discharge region DR and can move to the condenser 230. As the final filtration liquid FFL is separated from the mixed solution 144, the solute concentration in the mixed solution 144 can be increased. Accordingly, the osmotic pressure of the mixed solution 144 can be increased.

As described with reference to FIG. 2, the membrane apparatus 2 controls at least one of the degree of vacuum of the discharge region DR and the temperature of the mixed solution 144 so as to adjust the solute concentration of the mixed solution 144 such that the mixed solution 144 has a desired osmotic pressure. The amount of vapor 146 can be adjusted by at least one of the concentration of the mixed solution 144 and the degree of vacuum of the discharge region DR. Accordingly, the permeation flux of the preliminary filtration liquid PFL with respect to the forward osmosis membrane 110 can be constantly maintained. It is preferable that the degree of vacuum of the discharge region DR is 1 Torr to 660 Torr in absolute pressure. If the degree of vacuum is as low as 661 Torr to 759 Torr, the temperature of the mixed solution has to be excessively increased to over 150° C. and thereby the final filtration liquid FFL can be discharged as vapor.

Figure 5:
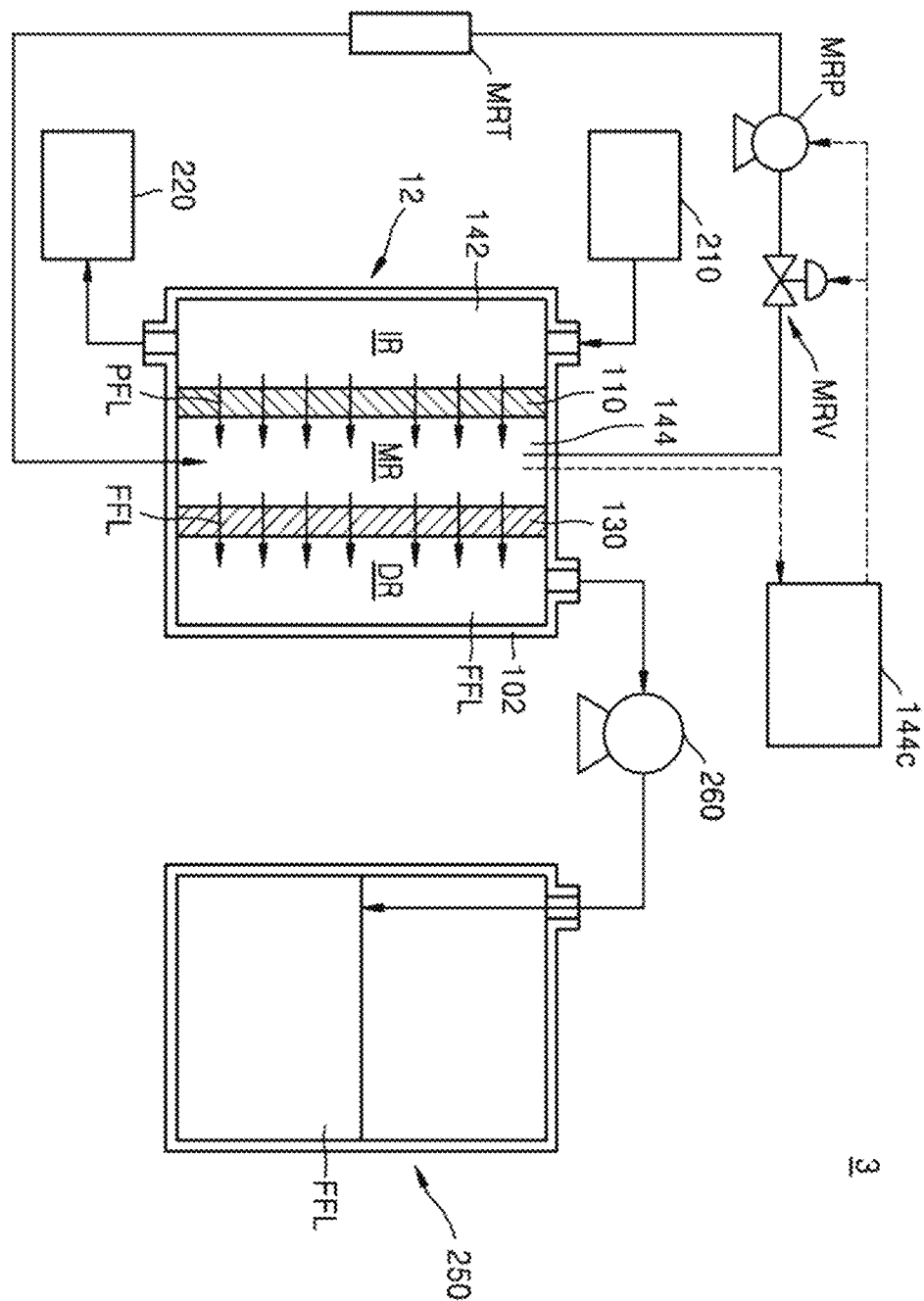
FIG. 5 is a block diagram of a membrane apparatus according to the exemplary aspects of the disclosure.

FIG. 5 is a block diagram of a membrane apparatus according to the exemplary aspects of the disclosure. For the sake of brief description, substantially the same content as described with reference to FIGS. 1 and 2 may not be described.

Referring to FIG. 5, a membrane apparatus 3 including a membrane chamber 12, the mixing pump MRP, a pressure adjustment valve MRV, a mixed solution storage portion MRT, the control portion 144c, the inlet liquid supply portion 210, the residue processing portion 220, a pump 260, and the filtration liquid storage portion 250 can be provided. The mixing pump MRP, the control portion 144c, the inlet liquid supply portion 210, and the residue processing portion 220 may be substantially the same as described with reference to FIG. 1.

The membrane chamber 12 can include the housing 102, the inlet region IR, the mixing region MR, the discharge region DR, the forward osmosis membrane 110, and a reverse osmosis membrane 130. Unlike the discharge region described with reference to FIG. 1, the discharge region DR can be provided with the final filtration liquid FFL. In the exemplary aspects of the disclosure, the final filtration liquid FFL can be provided in a part of the discharge region DR. That is, the vapor described with reference to FIGS. 1 and 2 cannot be provided in the discharge region DR. The reverse osmosis membrane 130 may be a membrane for reverse osmosis. For example, the reverse osmosis membrane 130 can act as a membrane when reverse osmosis occurs between the mixing region MR and the discharge region DR. The reverse osmosis membrane 130 can contain polymer, ceramic, carbon, or a combination thereof. For example, the reverse osmosis membrane 130 can include a cellulose acetate (CA) membrane, a polyamide (PA) membrane, a polysulfone membrane, or a combination thereof.

The preliminary filtration liquid PFL can be separated from the inlet liquid 142 by the forward osmosis membrane 110. The preliminary filtration liquid PFL can be mixed with a forward osmosis draw solution in the mixing region MR to make the mixed solution 144. For example, as the preliminary filtration liquid PFL is mixed with the mixed solution 144, the solute concentration in the mixed solution 144 can be decreased. Accordingly, an osmotic pressure of the mixed solution 144 can be lowered.

The final filtration liquid FFL can be separated from the mixed solution 144 by the reverse osmosis membrane 130. The mixed solution 144 can be pressurized such that the final filtration liquid FFL is separated from the mixed solution 144. For example, a pressure of the mixed solution 144 may be 20 bar to 80 bar. At this time, a pressure of the inlet liquid 142 can be substantially equal to the pressure of the mixed solution 144. If the pressure of the mixed solution 144 is lower than 20 bar, the final filtration liquid FFL cannot be separated smoothly from the mixed solution. It is not preferable to set the pressure of the mixed solution to 80 bar or higher because a large amount of energy is consumed.

For example, as the final filtration liquid FFL is separated from the mixed solution 144, the solute concentration of the mixed solution 144 can be increased. Accordingly, the osmotic pressure of the mixed solution 144 can increase.

The amount of final filtration liquid FFL separated from the mixed solution 144 can increase as the pressure of the mixed solution 144 increases. Accordingly, the pressure of the mixed solution 144 can be controlled to adjust the solute concentration of the mixed solution 144 such that the mixed solution 144 has a required osmotic pressure. If the pressure of the mixed solution 144 is adjusted such that the mixed solution 144 has a constant osmotic pressure, the permeation flux of the preliminary filtration liquid PFL with respect to the forward osmosis membrane 110 can be constantly maintained.

The final filtration liquid FFL can be moved from the discharge region DR to the filtration liquid storage portion 250 by the pump 260.

Unlike the control portion described with reference to FIG. 1, the control portion 144c can control the mixing pump MRP and the pressure adjustment valve MRV to adjust the concentration of the mixed solution 144. For example, the control portion 144c can control the mixing pump MRP and the pressure adjustment valve MRV such that the mixed solution 144 has a required pressure. In the exemplary aspects of the disclosure, the pressure of the mixed solution 144 is controlled by the control portion 144c, and thereby, the concentration of the mixed solution 144 can be constantly maintained. A mixed solution storage portion MRT can be provided between the mixing pump MRP and the mixing region MR. That is, the mixed solution 144 discharged from the mixing pump MRP can be supplied to the mixing region MR through the mixed solution storage portion MRT.

Figure 6:
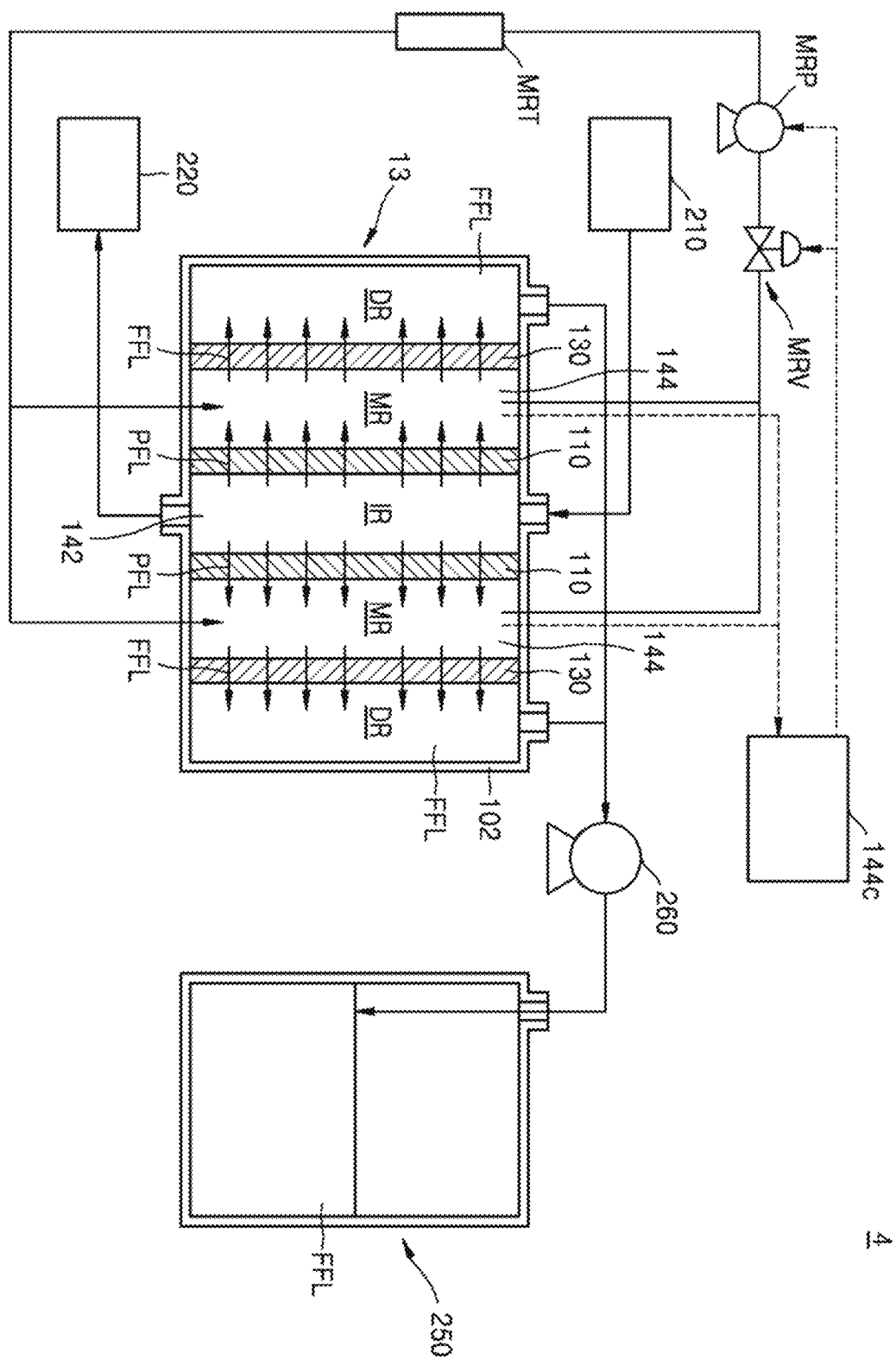
FIG. 6 is a block diagram of a membrane apparatus according to the exemplary aspects of the disclosure.
Figure 7:
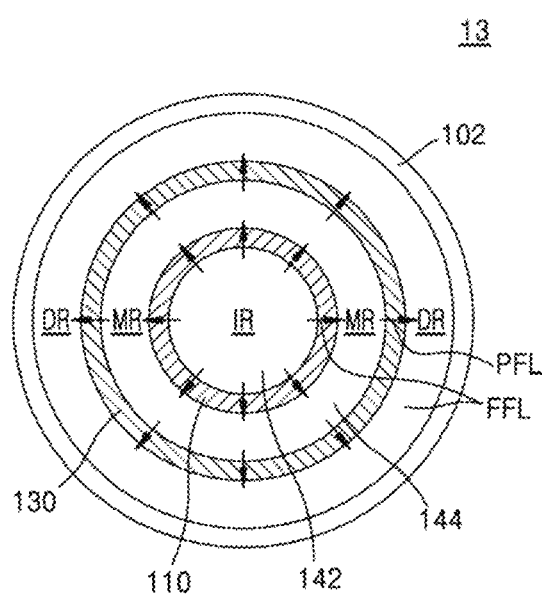
FIG. 7 is a sectional diagram of a membrane chamber of FIG. 6.

FIG. 6 is a block diagram of a membrane apparatus according to the exemplary aspects of the disclosure. FIG. 7 is a sectional view of the membrane chamber of FIG. 6. For the sake of brief description, substantially the same content as described with reference to FIG. 5 may not be described.

Referring to FIGS. 6 and 7, a membrane apparatus 4 including a membrane chamber 13, the mixing pump MRP, the pressure adjustment valve MRV, the mixed solution storage portion MRT, the control portion 144c, the inlet liquid supply portion 210, the residue processing membrane 220, the pump 260, and the filtration liquid storage portion 250 can be provided. The mixing pump MRP, the pressure adjustment valve MRV, the mixed solution storage portion MRT, the control portion 144c, the inlet liquid supply portion 210, the residue processing portion 220, the pump 260, and filtration liquid storage portion 250 may be substantially the same as described with reference to FIG. 5. The membrane chamber 13 may be substantially the same as the membrane chamber 12 described with reference to FIG. 5, except for a shape thereof. Hereinafter, the shape of the membrane chamber 13 will be described.

The membrane chamber 13 can include the housing 102, the inlet region IR, the mixing region MR, the discharge region DR, the forward osmosis membrane 110, and a reverse osmosis membrane 130. The housing 102 is illustrated in a cylindrical shape, and this is exemplary.

Unlike the forward osmosis membrane and the reverse osmosis membrane illustrated in FIG. 5, the forward osmosis membrane 110 and the reverse osmosis membrane 130 can have a tube shape or a hollow fiber shape. The forward osmosis membrane 110 can be surrounded by the reverse osmosis membrane 130. That is, a diameter of the forward osmosis membrane 110 can be less than a diameter of the reverse osmosis membrane 130. The forward osmosis membrane 110 and the reverse osmosis membrane 130 can be separated from each other.

The inlet region IR can be defined by an inner side surface of the forward osmosis membrane 110. The mixing region MR can be defined by an outer side surface of the forward osmosis membrane 110 and an inner side surface of the reverse osmosis membrane 130. The discharge region DR can be defined by an outer side surface of the reverse osmosis membrane 130 and an inner side surface of the housing 102.

The preliminary filtration liquid PFL can be separated from the inlet liquid 142 by the forward osmosis membrane 110 and provided to the mixing region MR. For example, the preliminary filtration liquid PFL can move radially in a diameter direction of the forward osmosis membrane 110. The preliminary filtration liquid (PFL) can be mixed with a forward osmosis draw solution in the mixing region MR to make the mixed solution 144. For example, as the preliminary filtration liquid PFL is mixed with the mixed solution 144, a solute concentration of the mixed solution 144 can be decreased. Accordingly, an osmotic pressure of the mixed solution 144 can be decreased.

The final filtration liquid FFL can be separated from the mixed solution 144 by the reverse osmosis membrane 130. The final filtration liquid FFL separated from the mixed solution 144 can be mixed with the final filtration liquid FFL filled in the discharge region DR. For example, as the final filtration liquid FFL is separated from the mixed solution 144, a solute concentration of the mixed solution 144 can be increased. Accordingly, an osmotic pressure of the mixed solution 144 can be increased.

The membrane apparatus 4 can control a pressure of the mixed solution 144 to adjust the solute concentration of the mixed solution 144 such that the mixed solution 144 has a desired osmotic pressure. If the pressure of the mixed solution 144 is adjusted such that the mixed solution 144 has a constant osmotic pressure, a permeation flux of the preliminary filtration liquid PFL with respect to the forward osmosis membrane 110 can be constantly maintained. For example, a pressure of the mixed solution 144 may be 20 bar to 80 bar. If the pressure of the mixed solution 144 is lower than 20 bar, the final filtration liquid FFL cannot be separated smoothly from the mixed solution. It is not preferable to set the pressure of the mixed solution to 80 bar or higher because a large amount of energy is consumed.

Figure 8:
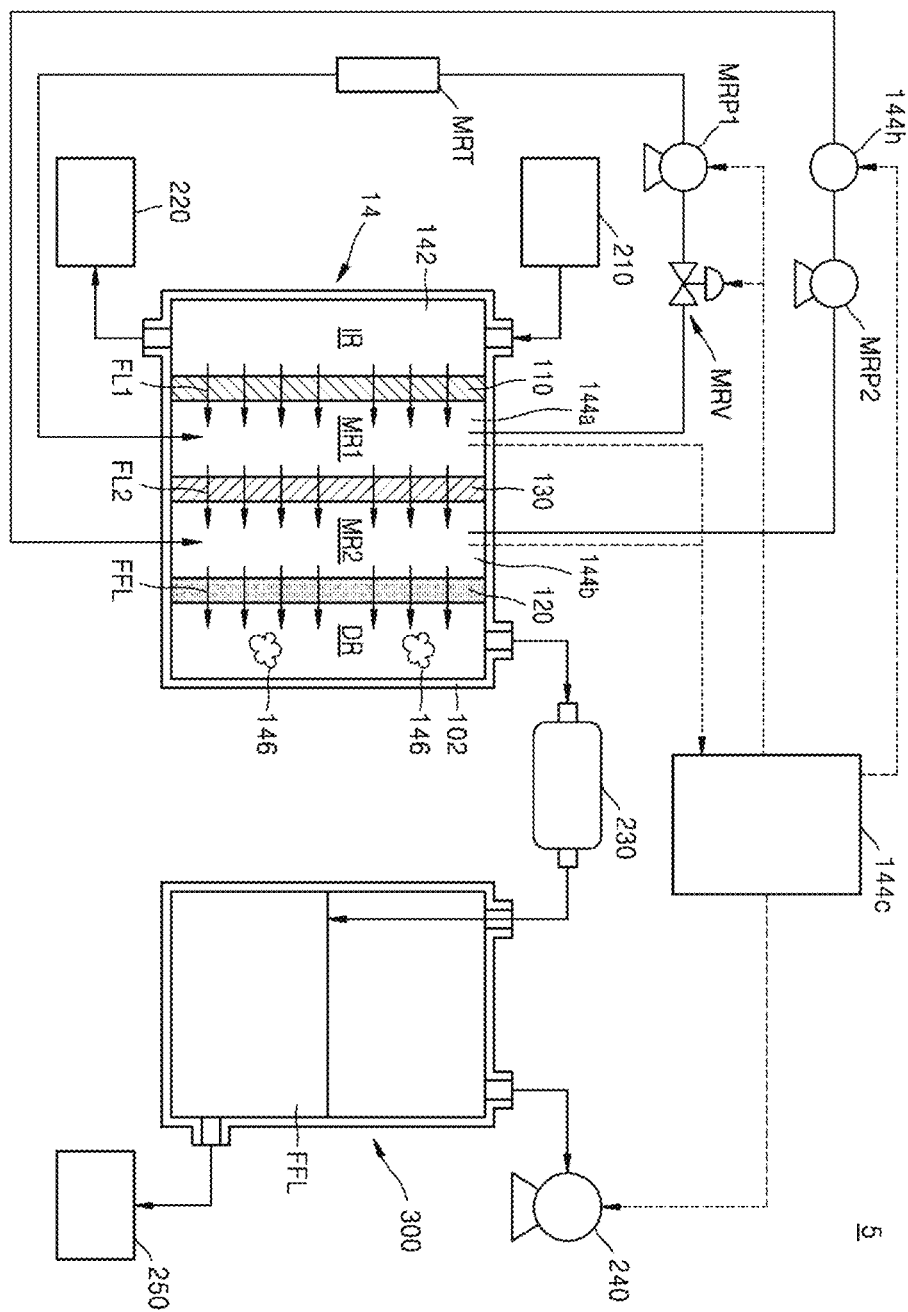
FIG. 8 is a block diagram of a membrane apparatus according to the exemplary aspects of the disclosure.

FIG. 8 is a block diagram of a membrane apparatus according to the exemplary aspects of the disclosure. For the sake of brief description, substantially the same contents as described with reference to FIGS. 1, 2, and 5 may not be described.

Referring to FIG. 8, a membrane apparatus 5 including a membrane chamber 14, first and second mixing pumps MRP1 and MRP2, the pressure adjustment valve MRV, the mixed solution storage portion MRT, the mixed solution heating portion 144h, the control portion 144c, the inlet liquid supply portion 210, the residue processing portion 220, the condenser 230, the vacuum pump 240, the filtration liquid storage portion 250, and the liquid collection chamber 300, can be provided. The inlet liquid supply portion 210, the residue processing portion 220, the condenser 230, the vacuum pump 240, the filtration liquid storage portion 250, and the liquid collection chamber 300 may be substantially the same as described with reference to FIG. 1. The first mixing pump MPR1, the mixed solution heating portion 144h, and the control portion 144c may be substantially the same as described with reference to FIG. 1. The second mixing pump MRP2, the pressure adjustment valve MRV, and the mixed solution storage portion MRT may be substantially the same as described with reference to FIG. 5. The control portion 144c can adjust a concentration of a first mixed solution 144a which will be described below.

Unlike the membrane chamber described with reference to FIG. 1, the membrane chamber 14 can further include the reverse osmosis membrane 130 between the forward osmosis membrane 110 and the pervaporation membrane 120. The reverse osmosis membrane 130 may be substantially the same as the reverse osmosis membrane 130 described with reference to FIG. 5.

The mixing region MR can include the first mixing region MR1 and the second mixing region MR2 separated from each other by the reverse osmosis membrane 130. The first mixing region MR1 is disposed between the forward osmosis membrane 110 and the reverse osmosis membrane 130, and the second mixing region MR2 is disposed between the reverse osmosis membrane 130 and the pervaporation membrane 120.

A forward osmosis draw solution can be provided in the first mixing region MR1. The forward osmosis draw solution can have a higher solute concentration than the inlet liquid 142. A first filtration liquid FL1 can be separated from the inlet liquid 142 by a forward osmosis phenomenon and provided to a first mixing region MR1. The first filtration liquid FL1 may be substantially the same as the preliminary filtration liquid PFL described with reference to FIG. 3.

The first filtration liquid FL1 can be mixed with the forward osmosis draw solution in the first mixing region MR1 to make the first mixed solution 144a. The first mixed solution 144a may be substantially the same as the mixed solution 144 described with reference to FIG. 1. A pressure of the first mixed solution 144a may be substantially the same as the pressure of the inlet liquid 142. For example, the pressure of the first mixed solution 144a and the pressure of the inlet liquid 142 can be 20 bar to 80 bar. Accordingly, it is possible to prevent a reverse osmosis phenomenon from occurring between the inlet liquid 142 and the first mixed solution 144a. That is, it is possible to prevent the first filtration liquid FL1 from moving back to the inlet liquid 142 from the first mixed solution 144a. As the first filtration liquid FL1 is mixed with the first mixed solution 144a, a solute concentration of the first mixed solution 144a can be decreased. Accordingly, an osmotic pressure of the first mixed solution 144a can be decreased.

A second filtration liquid FL2 can be separated from the first mixed solution 144a. The second filtration liquid FL2 can contain a permeation target substance of the first mixed solution 144a. For example, the second filtration liquid FL2 can be obtained by making pure water and a part of the first mixed solution 144a pass through the reverse osmosis membrane 130. The second filtration liquid FL2 can be collected in the second mixing region MR2 to make the second mixed solution 144b. A pressure of the first mixed solution 144a can be high enough to separate the second permeate liquid FL2 from the first mixed solution 144a. For example, the pressure of the first mixed solution 144a may be 20 bar to 80 bar. If the pressure of the first mixed solution 144a is lower than 20 bar, the second filtration liquid FL2 cannot be separated smoothly from the first mixed solution 144a. It is not preferable to set the pressure of the first mixed solution 144a to 80 bar or higher because a large amount of energy is consumed. For example, as the second filtration liquid FL2 is separated from the first mixed solution 144a, a solute concentration of the first mixed solution 144a can be increased. Accordingly, an osmotic pressure of the first mixed solution 144a can increase.

The final filtration liquid FFL can be separated from the second mixed solution 144b. The final filtration liquid FFL can be converted into the vapor 146 by the pervaporation membrane 130. In the exemplary aspects of the disclosure, a temperature of the second mixed solution 144b can be maintained at 15° C. to 150° C. by the mixed solution heating portion 144h. If the temperature of the second mixed solution 144b is higher than or equal to 150° C., selecting the membranes can be restricted and an energy consumption can be increased. If the temperature of the second mixed solution 144b is lower than or equal to 15° C., a pervaporation phenomenon may not occur smoothly.

The discharge region DR can enter a vacuum state. For example, it is preferable that a degree of vacuum of the discharge region DR is 1 Torr to 660 Torr in absolute pressure. If the degree of vacuum is as low as 661 Torr to 759 Torr, a temperature of the mixed solution has to be excessively increased to over 150° C. and thereby the final filtration liquid FFL can be discharged as vapor. The discharge region DR can store the vapor 146. The pervaporation membrane 130, the discharge region DR, and the final filtration liquid FFL can be substantially the same as described with reference to FIG. 1.

At least one of the pressure of the first mixed solution 144a, the temperature of the second mixed solution 144b, and the degree of vacuum of the discharge region DR can be controlled to adjust the solute concentration of the first mixed solution 144a. The amount of vapor 146 can be adjusted by at least one of the pressure of the first mixed solution 144a, the temperature of the second mixed solution 144b, and the degree of vacuum of the discharge region DR. In this way, the permeate flux of the first filtration liquid FL1 with respect to the permeation membrane 110 can be constantly maintained.

Figure 9:
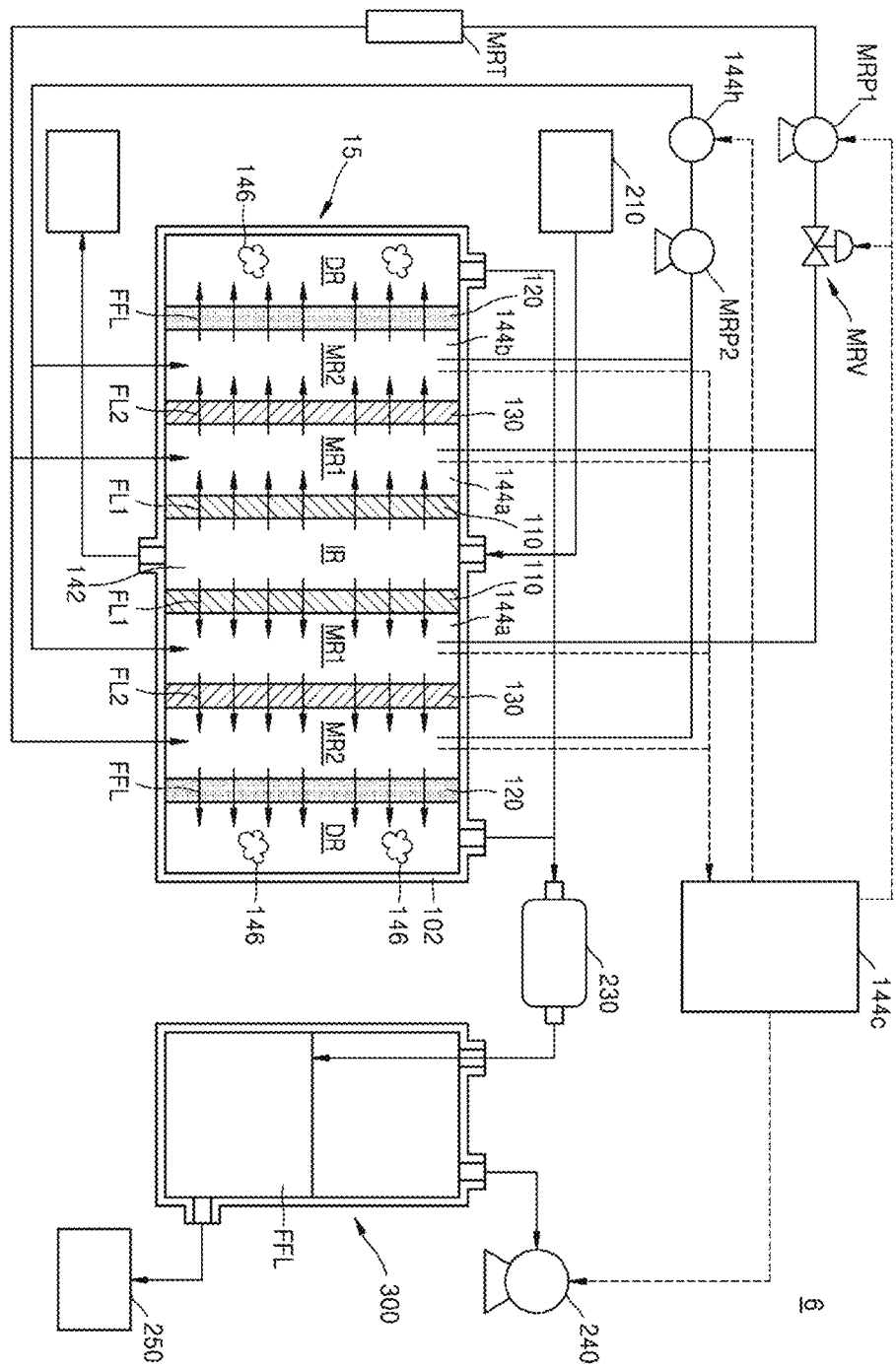
FIG. 9 is a block diagram of a membrane apparatus according to the exemplary aspects of the disclosure.
Figure 10:
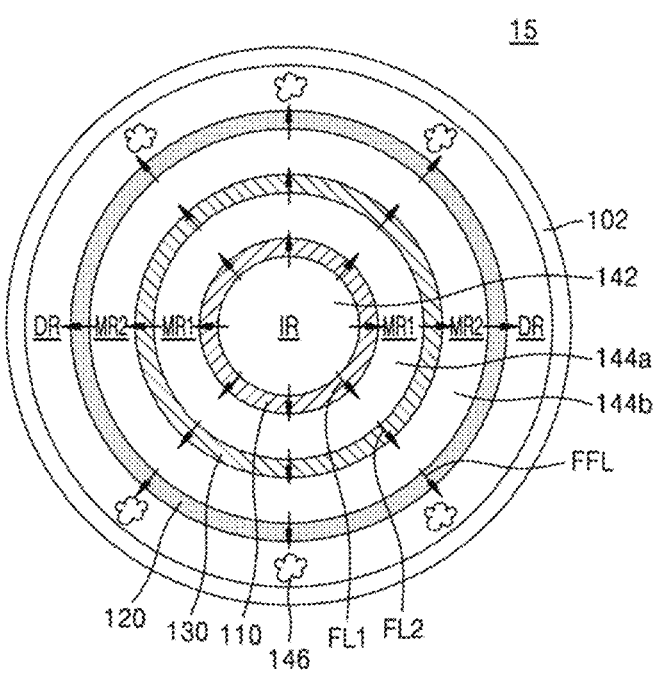
FIG. 10 is a sectional diagram of a membrane chamber of FIG. 9.

FIG. 9 is a block diagram of a membrane apparatus according to the exemplary aspects of the disclosure. FIG. 10 is a sectional diagram of the membrane chamber of FIG. 9. For the sake of brief description, substantially the same content as described with reference to FIGS. 3, 4, and 5 may not be described.

Referring to FIGS. 9 and 10, a membrane apparatus 6 including a membrane chamber 15, the first and second mixing pumps MRP1 and MRP2, the pressure adjustment valve MRV, the mixed solution storage portion MRT, the mixed solution heating portion 144h, the control portion 144c, the inlet liquid supply portion 210, the residue processing portion 220, the condenser 230, the vacuum pump 240, the filtration liquid storage portion 250, and the liquid collection chamber 300, can be provided. The first and second mixing pumps MRP1 and MRP2, the pressure adjustment valve MRV, the mixed solution storage portion MRT, the mixed solution heating portion 144h, the control portion 144c, the inlet liquid supply portion 210, the residue processing portion 220, the condenser 230, the vacuum pump 240, the filtration liquid storage portion 250, and the liquid collection chamber 300 may be substantially the same as described with reference to FIG. 8.

Unlike the membrane chamber described with reference to FIGS. 3 and 4, the membrane chamber 15 can further include the reverse osmosis membrane 130 between the forward osmosis membrane 110 and the pervaporation membrane 120. The reverse osmosis membrane 130 may be substantially the same as the reverse osmosis membrane 130 described with reference to FIG. 8.

The mixing region MR can include the first mixing region MR1 and the second mixing region MR2 which are separated from each other by the reverse osmosis membrane 130. The first mixing zone MR1 can be located between the forward osmosis membrane 110 and the reverse osmosis membrane 130, and the second mixing region MR2 can be placed between the reverse osmosis membrane 130 and the pervaporation membrane 120.

A forward osmosis draw solution can be provided in the first mixing region MR1. The forward osmosis draw solution can have a higher solute concentration than the inlet liquid 142. The first filtration liquid FL1 can be separated from the inlet liquid 142 due to a forward osmosis phenomenon and can move to the first mixing region MR1. The first filtration liquid FL1 may be substantially the same as the preliminary filtration liquid PFL described with reference to FIG. 3.

The first filtration liquid FL1 can be mixed with the forward osmosis draw solution in the first mixing region MR1 to make the first mixed solution 144a. The first mixed solution 144a may be substantially the same as the mixed solution 144 described with reference to FIG. 1. A pressure of the first mixed solution 144a may be substantially the same as the pressure of the inlet liquid 142. For example, the pressure of the first mixed solution 144a and the pressure of the inlet liquid 142 may be 20 bar to 80 bar. Accordingly, it is possible to prevent a reverse osmosis phenomenon from occurring between the inlet liquid 142 and the first mixed solution 144a. That is, it is possible to prevent the first filtration liquid FL1 from moving back to the inlet liquid 142 from the first mixed solution 144a. For example, as the first filtration liquid FL1 is mixed with the first mixed solution 144a, a solute concentration of the first mixed solution 144a can be decreased. Accordingly, the osmotic pressure of the first mixed solution 144a can be lowered.

It is not preferable to set the pressure of the first mixed solution 144a to 80 bar or higher because a large amount of energy is consumed. The second filtration liquid FL2 can be separated from the first mixed solution 144a and move to the second mixing region MR2. For example, the second filtration liquid FL2 can include a solvent of the first mixed solution 144a. For example, the second filtration liquid FL2 can be obtained by making pure water and a part of the first mixed solution 144a pass through the reverse osmosis membrane 130. The second filtration liquid FL2 can be collected in the second mixing region MR2 to make the second mixed solution 144b. A pressure of the first mixed solution 144*a* can be large enough to separate the second filtration liquid FL2 from the first mixed solution 144*a*. For example, the pressure of the first mixed solution 144*a* and the pressure of the inlet liquid 142 may be 20 bar to 80 bar. If the pressure of the first mixed solution 144*a* is lower than 20 bar, the second filtration liquid FL2 cannot be separated smoothly from the first mixed solution 144*a*.

For example, as the second filtration liquid FL2 is separated from the first mixed solution 144*a*, a solute concentration of the first mixed solution 144*a* can be increased. Accordingly, an osmotic pressure of the first mixed solution 144*a* can be increased.

The final filtration liquid FFL can be separated from the second mixed solution 144*b*. In the exemplary aspects of the disclosure, a temperature of the second mixed solution 144*b* can be maintained at 15° C. to 150° C. by the mixed solution heating portion 144*h*. If the temperature of the second mixed solution 144*b* is higher than or equal to 150° C., selecting the membranes can be restricted and an energy consumption can be increased. If the temperature of the second mixed solution 144*b* is lower than or equal to 15° C., a pervaporation phenomenon may not occur smoothly.

The final filtration liquid FFL can be converted into the vapor 146 by the pervaporation membrane 130. The discharge region DR can store the vapor 146. The pervaporation membrane 130, the discharge region DR, and the final filtration liquid FFL can be substantially the same as described with reference to FIG. 3. The discharge region DR can enter a vacuum state. For example, it is preferable to set a degree of vacuum of the discharge region DR to 1 Torr to 660 Torr in absolute pressure. If the degree of vacuum is as low as 661 Torr to 759 Torr, a temperature of the mixed solution has to be excessively increased to over 150° C. and thereby the final filtration liquid FFL can be discharged as vapor.

At least one of the pressure of the first mixed solution 144*a*, the temperature of the second mixed solution 144*b*, and the degree of vacuum of the discharge region DR can be controlled to adjust a solute concentration of the first mixed solution 144*a*. The amount of vapor 146 can be adjusted by at least one of the pressure of the first mixed solution 144*a*, the temperature of the second mixed solution 144*b*, and the degree of vacuum of the discharge region DR. In this way, a permeation flux of the first filtration liquid FL1 with respect to the permeation membrane 110 can be constant maintained.

Figure 11:
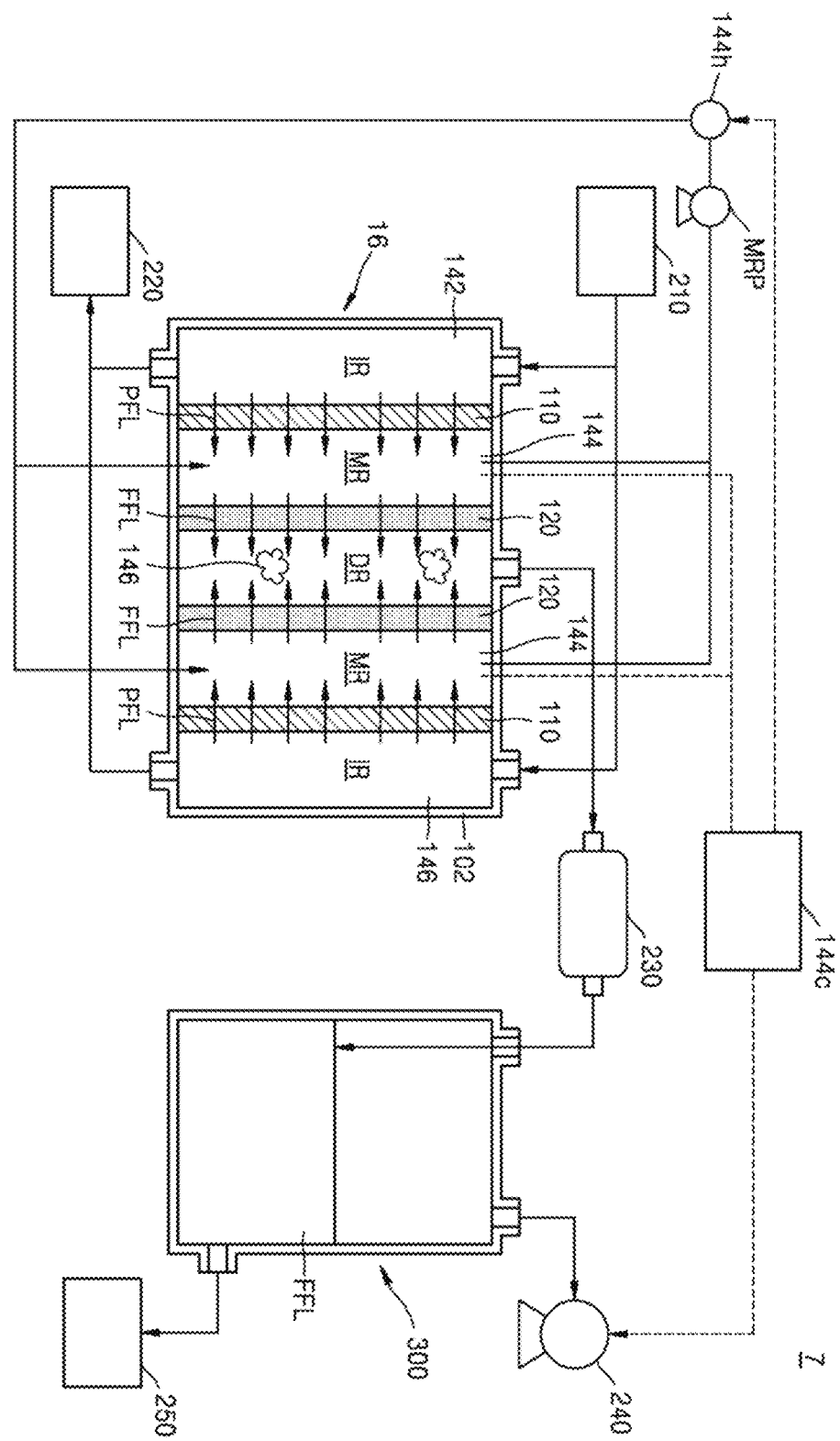
FIG. 11 is a block diagram of a membrane apparatus according to the exemplary aspects of the disclosure.

FIG. 11 is a block diagram of a membrane apparatus according to the exemplary aspects of the disclosure. For the sake of brief description, substantially the same content as described with reference to FIGS. 1, 2, and 5 may not be described.

Referring to FIG. 11, a membrane apparatus 7 including a membrane chamber 16, the mixing pump MRP, the mixed solution heating portion 144*h*, the control portion 144*c*, the inlet liquid supply portion 210, the residue processing portion 220, the condenser 230, the vacuum pump 240, the filtration liquid storage portion 250, and the liquid collection chamber 300, can be provided. The mixing pump MRP, the mixed solution heating portion 144*h*, the control portion 144*c*, the inlet liquid supply portion 210, the residue processing portion 220, the condenser 230, the vacuum pump 240, the filtration liquid storage portion 250, and the liquid collection chamber 300 may be substantially the same as described with reference to FIG. 1.

Unlike the membrane chamber described with reference to FIG. 1, the membrane chamber 16 can include a pair of mixing regions MR and a pair of inlet regions IR arranged around the discharge region DR therein. The pair of mixing regions MR can be separated from each other with the discharge region DR therebetween. The pair of inlet regions IR can be separated from each other with the pair of mixing regions MR therebetween.

A pair of forward osmosis membranes 110 can be provided between the pair of inlet regions IR and the pair of mixing regions MR, respectively. A pair of pervaporation membranes 120 can be provided between the pair of mixing regions MR and the discharge region DR, respectively. The pair of inlet regions IR, the pair of mixing regions MR, the discharge region DR, the pair of forward osmosis membranes 110, and the pair of pervaporation membranes 120 may be substantially the same as described with reference to FIG. 1.

The Inlet liquids 142 can be provided in the pair of inlet regions IR, respectively. The preliminary filtration liquids PFL can be separated from the inlet liquids 142 due to a forward osmosis phenomenon and can move to the pair of mixing regions MR, respectively. The preliminary filtration liquids PFL can be mixed with the forward osmosis draw solutions in the pair of mixing regions MR to make the mixed solutions 144. The final filtration liquids FFL can be separated from the mixed solutions 144 due to a pervaporation phenomenon and converted into the vapor 146 in the discharge region DR. The vapor 146 can be converted into the final filtration liquid FFL again as described with reference to FIGS. 1 and 2 and stored in the filtration liquid storage portion 250.

Since the amount of final filtration liquid FFL separated from the mixed solution 144 can be adjusted depending on at least one of a degree of vacuum of the discharge region DR and a temperature of the mixed solution 144, at least one of the degree of vacuum of the discharge region DR and the temperature of the mixed solution 144 can be controlled to adjust a solute concentration of the mixed solution 144. The amount of vapor 146 can be adjusted depending on at least one of a concentration of the mixed solution 144 and a degree of vacuum of the discharge region DR. A solute concentration of the mixed solution 144 can be adjusted such that the mixed solution 144 has a desired osmotic pressure. If the osmotic pressure of the mixed solution 144 is constantly maintained, a permeation flux of the preliminary filtration liquid PFL with respect to the forward osmosis membrane 110 can be constantly maintained. It is preferable to set the degree of vacuum of the discharge region DR to 1 Torr to 660 Torr in absolute pressure. If the degree of vacuum is as low as 661 Torr to 759 Torr, a temperature of the mixed solution has to be excessively increased to over 150° C. and thereby the final filtration liquid FFL can be discharged as vapor.

In the exemplary aspects of the disclosure, the temperature of the mixed solution 144 can be maintained at 15° C. to 150° C. by the mixed solution heating portion 144*h*. If the temperature of the mixed solution 144 is higher than or equal to 150° C., selecting the membranes can be restricted and an energy consumption can be increased. If the temperature of the mixed solution 144 is lower than or equal to 15° C., a pervaporation phenomenon may not occur smoothly.

In other exemplary aspects of the disclosure, positions of the forward osmosis membrane 110 and the pervaporation membrane 120 can be interchanged. Accordingly, positions of the discharge region DR and the inlet region IR can be interchanged.

Figure 12:
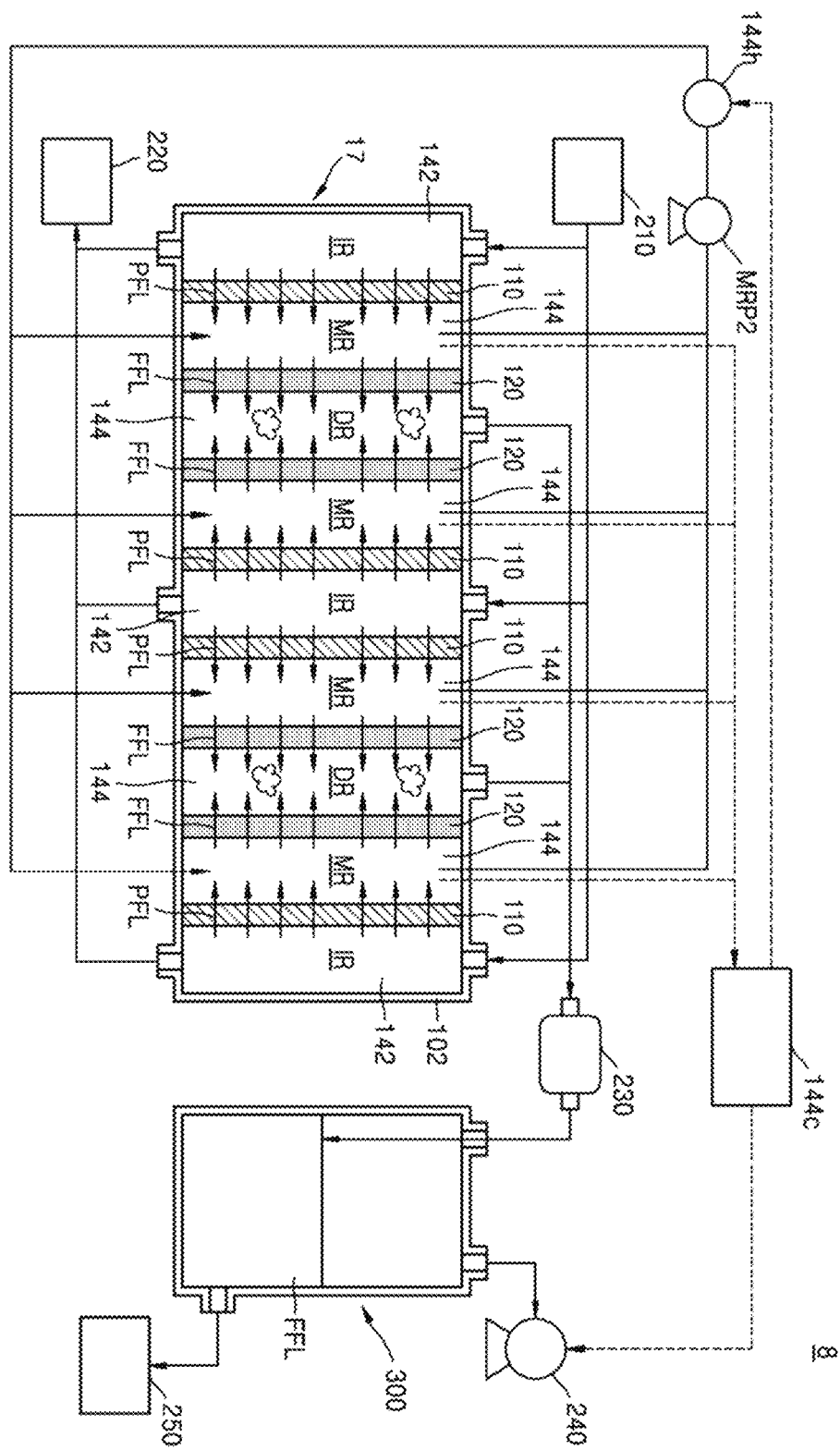
FIG. 12 is a block diagram of a membrane apparatus according to the exemplary aspects of the disclosure.
Figure 13:
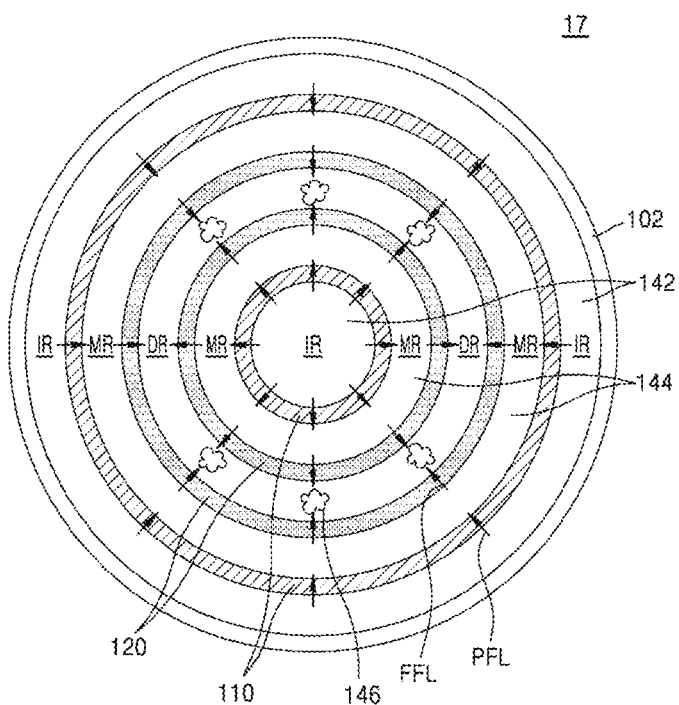
FIG. 13 is a sectional diagram of a membrane chamber of FIG. 12.

FIG. 12 is a block diagram of a membrane apparatus according to the exemplary aspects of the disclosure. FIG. 13 is a sectional diagram of the membrane chamber of FIG.

12. For the sake of brief description, substantially the same content as described with reference to FIGS. 3, 4, and 5 may not be described.

Referring to FIGS. 12 and 13, a membrane apparatus 8 including a membrane chamber 17, the mixing pump MRP, the mixed solution heating portion 144h, the control portion 144c, the inlet liquid supply portion 210, the residue processing portion 220, the condenser 230, the vacuum pump 240, the filtration liquid storage portion 250, and the liquid collection chamber 300, can be provided. The mixing pump MRP, the mixed solution heating portion 144h, the control portion 144c, the inlet liquid supply portion 210, the residue processing portion 220, the condenser 230, the vacuum pump 240, the filtration liquid storage portion 250, and the liquid collection chamber 300 can be substantially the same as described with reference to FIG. 3.

Unlike the membrane chamber described with reference to FIG. 3, the membrane chamber 17 can include a pair of inlet regions IR, a pair of mixing regions MR, and the discharge region DR. The pair of inlet regions IR can be provided in the innermost and outermost sides of the membrane chamber 17, respectively. The discharge region DR can be disposed between the pair of inlet regions IR. The pair of mixing regions MR can be disposed between the pair of inlet regions IR and the discharge region DR, respectively.

A pair of forward osmosis membranes 110 can be provided between the pair of inlet regions IR and the pair of mixing regions MR, respectively. A pair of pervaporation membranes 120 can be provided between the pair of mixing regions MR and the discharge region DR, respectively. The pair of inlet regions IR, the pair of mixing regions MR, the discharge region DR, the pair of forward osmosis membranes 110, and the pair of pervaporation membranes 120 can be substantially the same as described with reference to FIG. 1.

The inlet liquids 142 can be provided in the pair of inlet regions IR, respectively. The preliminary filtration liquids PFL can be separated from the inlet liquids 142 due to a forward osmosis phenomenon and can move to the pair of mixing regions MR, respectively. The preliminary filtration liquids PFL can be mixed with the forward osmosis draw solutions in the pair of mixing regions MR to make the mixed solutions 144. The final filtration liquids FFL can be separated from the mixed solutions 144 due to a pervaporation phenomenon and converted into the vapor 146 in the discharge region DR. The vapor 146 can be converted into the final filtration liquid FFL again as described with reference to FIGS. 1 and 2 and stored in the filtration liquid storage portion 250.

Since the amount of final filtration liquid FFL separated from the mixed solution 144 can be adjusted depending on at least one of a degree of vacuum of the discharge region DR and a temperature of the mixed solution 144, at least one of the degree of vacuum of the discharge region DR and the temperature of the mixed solution 144 can be controlled to adjust a solute concentration of the mixed solution 144. The amount of vapor 146 can be adjusted depending on at least one of a concentration of the mixed solution 144 and the degree of vacuum of the discharge region DR. The solute concentration of the mixed solution 144 can be adjusted such that the mixed solution 144 has a desired osmotic pressure. If the osmotic pressure of the mixed solution 144 is constantly maintained, a permeation flux of the preliminary filtration liquid PFL with respect to the forward osmosis membrane 110 can be constantly maintained.

It is preferable to set the degree of vacuum of the discharge region DR to 1 Torr to 660 Torr in absolute pressure. If the degree of vacuum is as low as 661 Torr to 759 Torr, the temperature of the mixed solution has to be excessively increased to over 150° C. and thereby the final filtration liquid FFL can be discharged as vapor.

In the exemplary aspects of the disclosure, the temperature of the mixed solution 144 can be maintained at 15° C. to 150° C. by the mixed solution heating portion 144h. If the temperature of the mixed solution 144 is higher than or equal to 150° C., selecting the membranes can be restricted and an energy consumption can be increased. If the temperature of the mixed solution 144 is lower than or equal to 15° C., a pervaporation phenomenon may not occur smoothly.

In other exemplary aspects of the disclosure, positions of the forward osmosis membrane 110 and the pervaporation membrane 120 can be interchanged. Accordingly, positions of the discharge region DR and the inlet region IR can be interchanged. Generally, as a forward osmosis process is performed, a concentration of the forward osmosis draw solution can be decreased. If the concentration of the forward osmosis draw solution is decreased, the forward osmosis phenomenon may not occur smoothly. According to the present disclosure, since the preliminary filtration liquid PFL flows into the mixed solution 144 and simultaneously, the final filtration liquid FFL is separated from the mixed solution 144, the concentration of the mixed solution 144 can be constantly maintained. Accordingly, the forward osmosis phenomenon can occur smoothly. As a result, the membrane apparatus 8 with improved forward osmosis performance can be provided.

Figure 14:
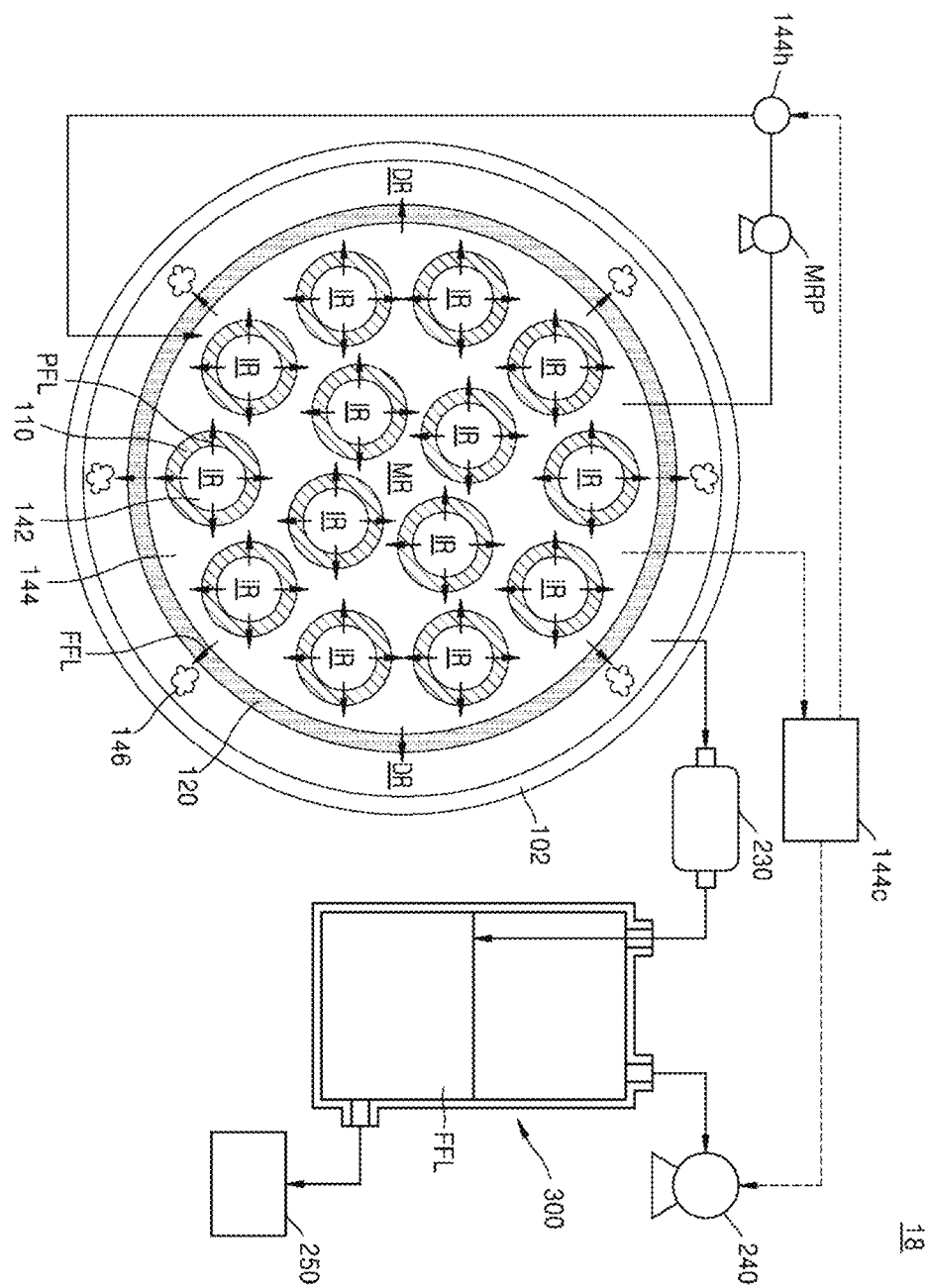
FIG. 14 is a block diagram of a membrane chamber according to the exemplary aspects of the disclosure.

FIG. 14 is a sectional diagram of a membrane chamber according to the exemplary aspects of the disclosure. For the sake of brief description, substantially the same content as described with reference to FIGS. 3 and 4 may not be described.

Referring to FIG. 14, the membrane chamber 18 can include the housing 102, a plurality of the forward osmosis membranes 110, the pervaporation membrane 120, a plurality of the inlet regions IR, the mixing region MR, and the discharge region DR. The housing 102 can be substantially the same as the housing described with reference to FIGS. 3 and 4.

The pervaporation membrane 120 can be provided in a region defined by an inner side surface of the housing 102. The pervaporation membrane 120 can have a tube shape or a hollow fiber shape. An outer diameter of the pervaporation membrane 120 can be smaller than an inner diameter of the housing 102. An outer side surface of the pervaporation membrane 120 and an inner side surface of the housing 102 can face each other.

The discharge region DR can be provided between the pervaporation membrane 120 and the housing 102. That is, the discharge region DR can be defined by the outer side surface of the pervaporation membrane 120 and the inner side surface of the housing 102.

A plurality of the forward osmosis membranes 110 can be provided in a region defined by the inner side surface of the pervaporation membrane 120.

The mixing region MR can be provided between the plurality of forward osmosis membranes 110 and the pervaporation membrane 120. That is, the mixing region MR can be defined by the outer side surfaces of the plurality of the forward osmosis membranes 110 and the inner side surface of the pervaporation membrane 120.

A plurality of the inlet regions IR can be defined by the inner side surfaces of a plurality of the forward osmosis membranes 110, respectively.

The Inlet liquids 142 can be provided in the plurality of inlet regions IR, respectively. The preliminary filtration liquids PFL can be separated from the inlet liquids 142 due to a forward osmosis phenomenon and can move to the mixing regions MR. The preliminary filtration liquids PFL can be mixed with the forward osmosis draw solution in the mixing region MR to make the mixed solution 144.

In the exemplary aspects of the disclosure, a temperature of the mixed solution 144 can be maintained at 15° C. to 150° C. by the mixed solution heating portion 144h. If the temperature of the mixed solution 144 is higher than or equal to 150° C., selecting the membranes can be restricted and an energy consumption can be increased. If the temperature of the mixed solution 144 is lower than or equal to 15° C., a pervaporation phenomenon may not occur smoothly.

The final filtration liquids FFL can be separated from the mixed solutions 144 due to the pervaporation phenomenon and converted into the vapor 146 in the discharge region DR. The discharge region DR can enter a vacuum state. It is preferable to set a degree of vacuum of the discharge region DR to 1 Torr to 660 Torr in absolute pressure. If the degree of vacuum is as low as 661 Torr to 759 Torr, a temperature of the mixed solution has to be excessively increased to over 150° C. and thereby the final filtration liquid FFL can be discharged as vapor.

According to the disclosure, the membrane chamber 18 can be provided in which permeation fluxes of the preliminary filtration liquids PFL with respect to the plurality of forward osmosis membranes 110 are constantly maintained.

At least one of the degree of vacuum in the discharge region DR and the temperature of the mixed solution 144 is controlled, and thereby, a solute concentration of the mixed solution 144 can be adjusted. The amount of vapor 146 can be adjusted by at least one of a concentration of the mixed solution 144 and the degree of vacuum of the discharge region DR.

Figure 15:
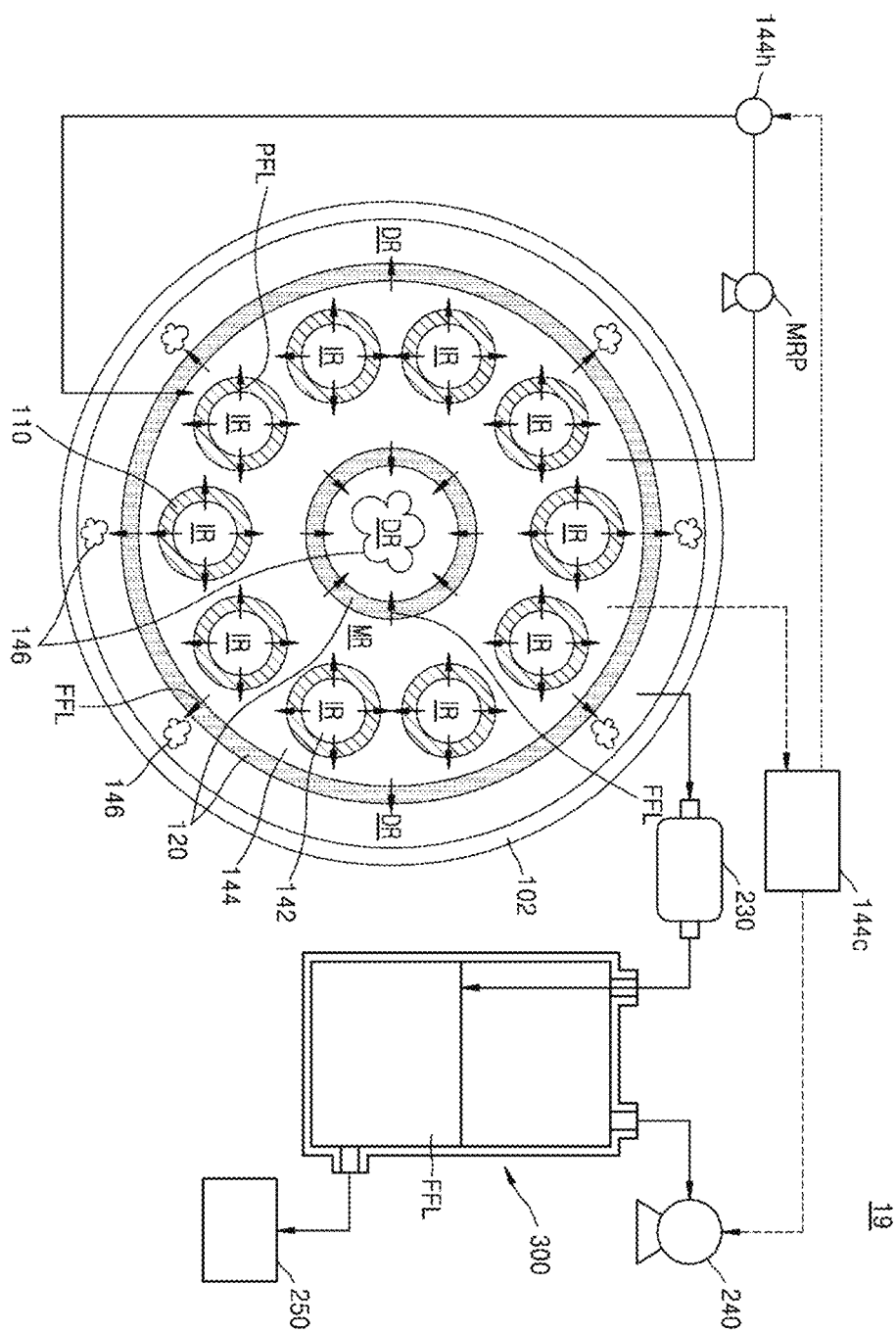
FIG. 15 is a block diagram of a membrane chamber according to the exemplary aspects of the disclosure.

FIG. 15 is a sectional diagram of a membrane chamber according to the exemplary aspects of the disclosure. For the sake of brief description, substantially the same content as described with reference to FIGS. 3 and 4 may not be described.

Referring to FIG. 15, a membrane chamber 19 can include a housing 102, a plurality of forward osmosis membranes 110, a pair of pervaporation membranes 120, a plurality of inlet regions IR, a mixing region MR, and a pair of discharge regions DR. The housing 102 can be substantially the same as the housing described with reference to FIGS. 3 and 4.

The pair of pervaporation membranes 120 can be provided in a region defined by an inner side surface of the housing 102. The pervaporation membrane 120 can have a tube shape or a hollow fiber shape. An outer diameter of the pervaporation membrane 120 can be smaller than an inner diameter of the housing 102. An outer side surface of the pervaporation membrane 120 and an inner side surface of the housing 102 can face each other.

The discharge region DR can be provided between the pervaporation membrane 120 and the housing 102. That is, the discharge region DR can be defined by the outer side surface of the pervaporation membrane 120 and the inner side surface of the housing 102.

The plurality of forward osmosis membranes 110 can have a tube shape or a hollow fiber shape and can be provided in a region defined by an inner side surface of the pervaporation membrane 120.

The mixing region MR can be provided between the plurality of forward osmosis membranes 110 and the pervaporation membrane 120. That is, the mixing region MR can be defined by outer side surfaces of the plurality of the forward osmosis membranes 110 and the inner side surface of the pervaporation membrane 120.

The plurality of inlet regions IR can be defined by the inner side surfaces of the plurality of forward osmosis membranes 110, respectively.

The inlet liquids 142 can be provided in the plurality of inlet regions IR, respectively. The preliminary filtration liquids PFL can be separated from the inlet liquids 142 due to a forward osmosis phenomenon and can move to the mixing region MR. The preliminary filtration liquids PFL can be mixed with the forward osmosis draw solution in the mixing region MR to make the mixed solution 144.

In the exemplary aspects of the disclosure, a temperature of the mixed solution 144 can be maintained at 15° C. to 150° C. by the mixed solution heating portion 144h. If the temperature of the mixed solution 144 is higher than or equal to 150° C., selecting the membranes can be restricted and an energy consumption can be increased. If the temperature of the mixed solution 144 is lower than or equal to 15° C., a pervaporation phenomenon may not occur smoothly.

The final filtration liquids FFL can be separated from the mixed solutions 144 due to the pervaporation phenomenon and converted into the vapor 146 in the discharge region DR. The discharge region DR can enter a vacuum state. It is preferable to set a degree of vacuum of the discharge region DR to 1 Torr to 660 Torr in absolute pressure. If the degree of vacuum is as low as 661 Torr to 759 Torr, a temperature of the mixed solution has to be excessively increased to over 150° C. and thereby the final filtration liquid FFL can be discharged as vapor.

According to the disclosure, the membrane chamber 18 can be provided in which permeation fluxes of the pre-filtration liquids PFL with respect to the plurality of forward osmosis membranes 110 are constantly maintained.

At least one of the degree of vacuum in the discharge region DR and the temperature of the mixed solution 144 is controlled and thereby a solute concentration of the mixed solution 144 can be adjusted. The amount of vapor 146 can be adjusted by at least one of a concentration of the mixed solution 144 and the degree of vacuum of the discharge region DR.

Figure 16:
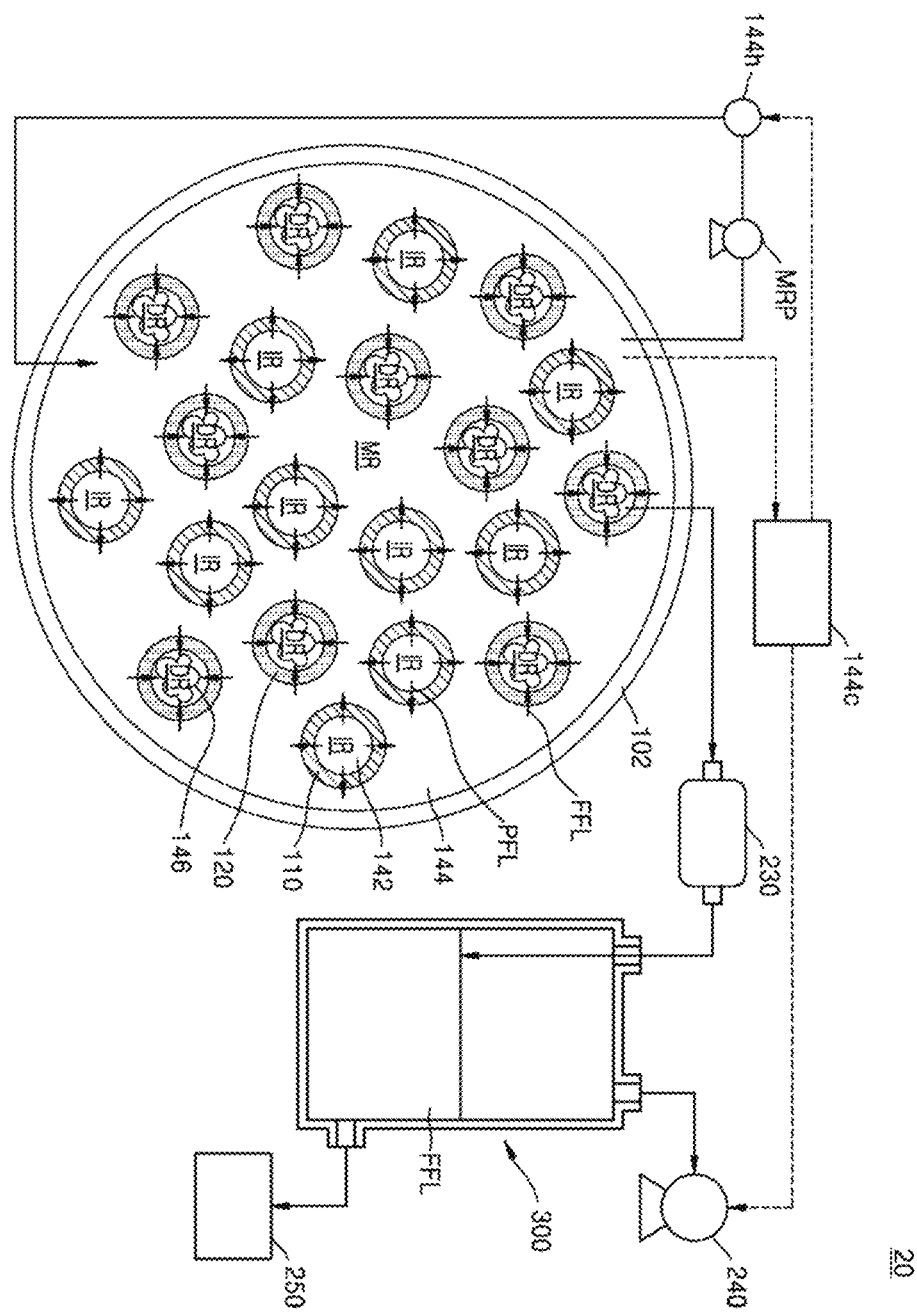
FIG. 16 is a block diagram of a membrane chamber according to the exemplary aspects of the disclosure.
Figure 17:
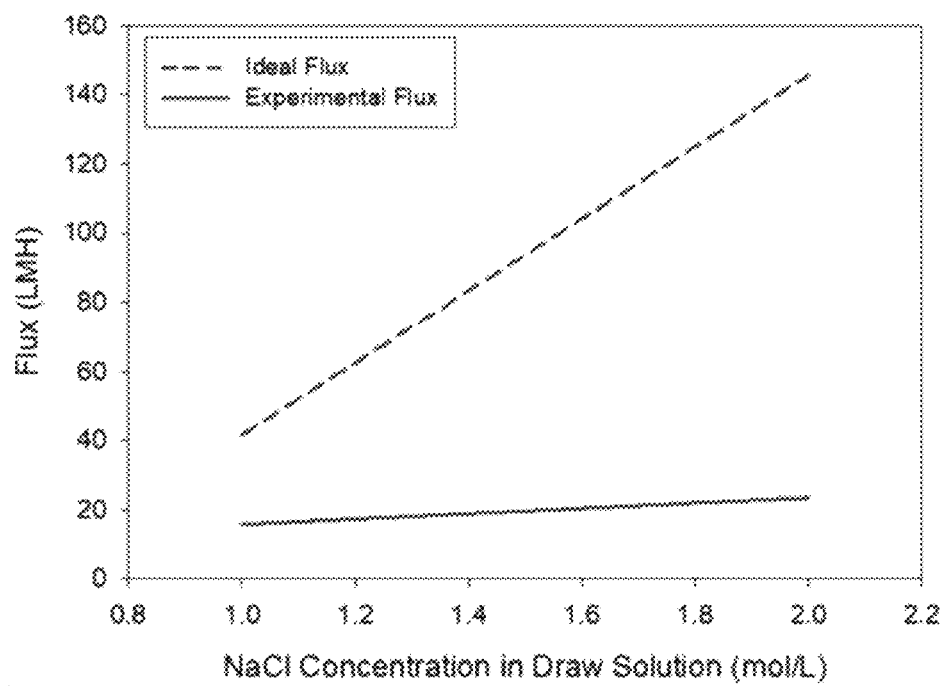
FIG. 17 is a graph illustrating a fresh water flux according to NaCl concentration as the draw solution. NaCl solution is used as the draw solution in a forward osmosis membrane apparatus to desalinate seawater having the NaCl concentration of 0.6 mol/L.

FIG. 16 is a sectional diagram of a membrane chamber according to the exemplary aspects of the disclosure. For the sake of brief description, substantially the same content as described with reference to FIGS. 3 and 4 may not be described.

Referring to FIG. 16, a membrane chamber 20 can include a housing 102, a plurality of forward osmosis membranes 110, a plurality of pervaporation membranes 120, a plurality of inlet regions IR, a mixing region MR, and a plurality of discharge regions DR. The housing 102 may be substantially the same as the housing described with reference to FIGS. 3 and 4.

The plurality of forward osmosis membranes 110 and the plurality of pervaporation membranes 120 can be provided in a region defined by an inner side surface of the housing 102. The plurality of forward osmosis membranes 110 and the plurality of pervaporation membranes 120 can have a hollow fiber shape or a tube shape. Among the regions defined by the inner side surface of the housing 102, regions other than the plurality of the forward osmosis membranes 110 and the plurality of the pervaporation membranes 120 may be the mixing region MR.

The Inlet liquids 142 can be provided in the plurality of inlet regions IR, respectively. The preliminary filtration liquids PFL can be separated from the inlet liquids 142 due to a forward osmosis phenomenon and can move to the mixing region MR. The preliminary filtration liquids PFL can be mixed with a forward osmosis draw solution in the mixing region MR to make the mixed solution 144. The mixed solution 144 can be circulated by the mixing pump MRP. In other exemplary aspects of the disclosure, a heating tube or a heating plate can be installed within the housing 102 and thereby the mixed solution 144 may not circulate.

In the exemplary aspects of the disclosure, a temperature of the mixed solution 144 can be maintained at 15° C. to 150° C. by the mixed solution heating portion 144h. If the temperature of the mixed solution 144 is higher than or equal to 150° C., selecting the membranes can be restricted and an energy consumption can be increased. If the temperature of the mixed solution 144 is lower than or equal to 15° C., a pervaporation phenomenon may not occur smoothly.

The final filtration liquids FFL can be separated from the mixed solutions 144 due to the pervaporation phenomenon and converted into the vapor 146 in the discharge region DR. The discharge region DR can enter a vacuum state. It is preferable to set a degree of vacuum of the discharge region DR to 1 Torr to 660 Torr in absolute pressure. If the degree of vacuum is as low as 661 Torr to 759 Torr, a temperature of the mixed solution has to be excessively increased to over 150° C. and thereby the final filtration liquid FFL is discharge as vapor.

According to the disclosure, the permeate chamber 18 can be provided in which permeation fluxes of the pre-filtration liquids PFL with respect to the plurality of forward osmosis membranes 110 are constantly maintained.

In other exemplary aspects of the disclosure, the reverse osmosis membrane 130 described with reference to FIG. 5 can be provided instead of the pervaporation membrane 120. A permeation target substance can be provided instead of the vapor 146 in the discharge region DR. The mixed solution 144 can be circulated by the mixing pump MRP. In other exemplary aspects of the disclosure, the mixed solution 144 can be pressurized by a forward osmosis pressure or can be pressurized by a pressurizing apparatus such as a pump, thereby, not circulating.

In addition, in order to further improve performance of a forward osmosis membrane, a first mixed solution is used between the forward osmosis membranes as a forward osmosis draw solution, and a second mixed solution is used between the forward osmosis membrane and a pervaporation membrane or between the forward osmosis membrane and a reverse osmosis membrane, and a solute concentration of the first mixed solution may be lower than a solute concentration of the second mixed solution.

At least one of a degree of vacuum of the discharge region DR and a temperature of the mixed solution 144 is controlled to adjust the solute concentration of the mixed solution 144. The amount of vapor 146 can be adjusted by at least one of the concentration of the mixed solution 144 and the degree of vacuum of the discharge region DR.

The above-described aspects on the technical idea of the present disclosure are examples describing the technical idea of the present disclosure. Therefore, the technical ideas of the present disclosure are not limited to the above-described aspects of the disclosure, and it is obvious that various modifications and changes such as combining the aspects of the disclosure can be made by those skilled in the art within the technical idea of the present disclosure.

| REFERENCE SIGNS LIST | | | |
|---|---|---|---|
| 1, 2, 3, 4, 5, 6, 7, 8: | Membrane apparatus | | |
| 10, 11, 12, 13, 14, 15, 16, 17, 18, 19, 20: | Membrane chamber | | |
| 102: | Housing | 110: | Forward osmosis membrane |
| 120: | Pervaporation membrane | 130: | Reverse osmosis membrane |
| IR: | Inlet region | MR: | Mixing region |
| DR: | Discharge region | | |
| 210: | Inlet liquid supply portion | | |
| 220: | Residue processing portion | | |
| 230: | Condenser | | |
| 240: | Vacuum pump | | |
| 250: | Filtration liquid storage portion | | |
| 260: | Pump | | |
| 300: | Liquid collection chamber | | |

What is claimed is:

1. A membrane apparatus comprising:
   a housing;
   a forward osmosis membrane that divides air internal space of the housing into an inlet region and a mixing region; and
   a pervaporation membrane that divides the internal space of the housing in the mixing region and a discharge region,
   wherein the forward osmosis membrane separates a preliminary filtration liquid from an inlet liquid which is provided in the inlet region and provides the separated preliminary filtration liquid to the mixing region,
   wherein the preliminary filtration liquid is mixed with a forward osmosis draw solution in the mixing region to make a mixed solution,
   wherein the pervaporation membrane separates a final filtration liquid from the mixed solution and provides the separated final filtration liquid to the discharge region,
   wherein the final filtration liquid is vaporized in the discharge region to make vapor, and
   wherein an amount of the vapor is adjusted by at least one of a temperature of the mixed solution and a degree of vacuum of the discharge region.

2. The membrane apparatus according to claim 1, further comprising a control portion that adjusts at least one of the temperature of the mixed solution and the degree of vacuum of the discharge region.

3. The membrane apparatus according to claim 1, wherein a solute concentration of the mixed solution is constantly maintained by separating the final filtration liquid from the mixed solution by using the pervaporation membrane.

4. The membrane apparatus according to claim 1, wherein the mixing region is exposed to a surface of the forward osmosis membrane, wherein a solute concentration of the mixed solution is constantly maintained along a direction parallel to the surface of the forward osmosis membrane.

5. The membrane apparatus according to claim 1, further comprising:
- an inlet liquid supply portion that supplies an inlet liquid to the inlet region;
- a condenser that condenses the vapor to regenerate a final filtration liquid; and
- a vacuum pump that adjusts the degree of vacuum of the discharge region.

6. The membrane apparatus according to claim 1, wherein the forward osmosis membrane has a flat plate shape extending along a direction, and a solute concentration of the mixed solution is constantly maintained along the direction.

7. The membrane apparatus according to claim 1, wherein the forward osmosis membrane and the pervaporation membrane have a tube shape or a hollow fiber shape.

8. The membrane apparatus according to claim 7, wherein a plurality of the forward osmosis membranes or a plurality of the pervaporation membranes are provided.

9. The membrane apparatus according to claim 1, further comprising a reverse osmosis membrane separate and distinct from both the forward osmosis membrane and pervaporation membrane, the reverse osmosis membrane configured to divide the mixing region into a first mixing region and a second mixing region.

10. A method of separating a solution using a membrane apparatus, the method comprising:
- preparing a housing, a forward osmosis membrane that divides an internal space of the housing into an inlet region and a mixing region, and a pervaporation membrane that divides the internal space of the housing into the mixing region and a discharge region;
- providing an inlet liquid and a forward osmosis draw solution to the inlet region and the mixing region, respectively;
- mixing the preliminary filtration liquid that is separated from the inlet liquid with the forward osmosis draw solution to make a mixed solution; and
- providing a final filtration :liquid that is separated from the mixed solution to the discharge region to evaporate the final filtration liquid in the discharge region,
- wherein a solute concentration of the mixed solution is constantly maintained.

11. The method of separating the solution using the membrane apparatus according to claim 10, further comprising controlling at least one of a temperature of the mixed solution and a degree of vacuum of the discharge region corresponding to the solute concentration of the mixed solution, wherein the amount of evaporation of the final filtration liquid is adjusted by at least one of the temperature of the mixed solution and the degree of vacuum of the discharge region.

12. The method of separating a solution using the membrane apparatus according to claim 10, further comprising condensing a vapor generated by evaporating the final filtration liquid to regenerate the final filtration liquid.

13. The method of separating a solution using the membrane apparatus according to claim 10, wherein an osmotic pressure of the mixed solution is constantly maintained.

* * * * *